(12) United States Patent
Li et al.

(10) Patent No.: US 10,904,549 B2
(45) Date of Patent: Jan. 26, 2021

(54) METHOD AND APPARATUS FOR SIGNALING OF MULTI-HYPOTHESIS FOR SKIP AND MERGE MODE AND SIGNALING OF DISTANCE OFFSET TABLE IN MERGE WITH MOTION VECTOR DIFFERENCE

(71) Applicant: Tencent America LLC, Palo Alto, CA (US)

(72) Inventors: Guichun Li, Milpitas, CA (US); Xiang Li, Saratoga, CA (US); Xiaozhong Xu, State College, PA (US); Byeongdoo Choi, Palo Alto, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/713,490

(22) Filed: Dec. 13, 2019

(65) Prior Publication Data
US 2020/0195948 A1   Jun. 18, 2020

Related U.S. Application Data

(60) Provisional application No. 62/779,407, filed on Dec. 13, 2018, provisional application No. 62/782,848, filed on Dec. 20, 2018.

(51) Int. Cl.
*H04N 19/44* (2014.01)
*H04N 19/176* (2014.01)
(Continued)

(52) U.S. Cl.
CPC ........... *H04N 19/44* (2014.11); *H04N 19/105* (2014.11); *H04N 19/176* (2014.11); *H04N 19/46* (2014.11)

(58) Field of Classification Search
CPC ...... H04N 19/176; H04N 19/52; H04N 19/46; H04N 19/105; H04N 19/159; H04N 19/70;
(Continued)

(56) References Cited

U.S. PATENT DOCUMENTS

| 9,686,556 B2* | 6/2017 | Chou | H04N 19/513 |
| 2013/0163669 A1* | 6/2013 | Lim | H04N 19/56 |
| | | | 375/240.15 |

(Continued)

FOREIGN PATENT DOCUMENTS

| WO | 2013/040994 A1 | 3/2013 |
| WO | 2017/157281 A1 | 9/2017 |

OTHER PUBLICATIONS

Bross et al. "Versatile Video Coding (Draft 2)" Joint Video Experts Team (JVET) of ITU-T SG 16 WP 3 and ISO/IEC JTC 1/SC 29/WG 11 11th Meeting: Ljubljana, SI, Jul. 10-18, 2018, Document: JVET-K1001-v7, 143 pages.*

(Continued)

*Primary Examiner* — Nathnael Aynalem
(74) *Attorney, Agent, or Firm* — Oblon, McClelland, Maier & Neustadt, L.L.P.

(57) ABSTRACT

A method of video decoding performed in a video decoder includes receiving a coded video bitstream including signaling information for a current block. The method further includes determining block reconstruction information for the current block based on the signaling information. The method further includes reconstructing the current block using the determined block reconstruction information.

16 Claims, 18 Drawing Sheets

(51) Int. Cl.
*H04N 19/46* (2014.01)
*H04N 19/105* (2014.01)

(58) Field of Classification Search
CPC ...... H04N 19/137; H04N 19/44; H04N 19/51; H04N 19/573; H04N 19/577; H04N 19/593; H04N 19/103; H04N 19/117; H04N 19/119; H04N 19/13; H04N 19/132; H04N 19/14; H04N 19/186; H04N 19/30; H04N 19/503; H04N 19/597; H04N 19/11; H04N 19/122; H04N 19/134; H04N 19/139; H04N 19/167; H04N 19/196; H04N 19/436; H04N 19/463; H04N 19/513; H04N 19/56; H04N 19/625; H04N 19/86; H04N 19/96
USPC .......................................... 375/240.01–240.29
See application file for complete search history.

(56) References Cited

U.S. PATENT DOCUMENTS

| | | | | |
|---|---|---|---|---|
| 2013/0177083 | A1* | 7/2013 | Chen | H04N 19/52 375/240.16 |
| 2014/0044179 | A1* | 2/2014 | Li | H04N 19/51 375/240.16 |
| 2014/0086329 | A1* | 3/2014 | Seregin | H04N 19/33 375/240.16 |
| 2015/0271515 | A1* | 9/2015 | Pang | H04N 19/70 375/240.16 |
| 2015/0373366 | A1 | 12/2015 | He et al. | |
| 2017/0264897 | A1* | 9/2017 | Takehara | H04N 19/573 |
| 2018/0199054 | A1* | 7/2018 | Hsu | H04N 19/52 |
| 2018/0302642 | A1 | 10/2018 | Schwarz et al. | |
| 2018/0376149 | A1* | 12/2018 | Zhang | H04N 19/107 |
| 2019/0246114 | A1* | 8/2019 | Tourapis | H04N 19/147 |
| 2019/0320180 | A1* | 10/2019 | Yu | H04N 19/105 |

OTHER PUBLICATIONS

Chiang et al. "CE10.1.1: Multi-hypothesis prediction for improving AMVP mode, skip or merge mode, and intra mode" Joint Video Experts Team (JVET) of ITU-T SG 16 WP 3 and ISO/IEC JTC 1/SC 29/WG 11 12th Meeting: Macao, CN, Oct. 3-12, 2018, Document: JVET-L0100-v2, 13 pages.*
International Search Report and Written Opinion dated Mar. 3, 2020 in corresponding PCT Application No. PCT/US19/66318 (17 pages).
High efficiency video coding (HEVC), Rec. ITU-T H.265 v4, Dec. 2016. (664 pages).
Bross et al., "Versatile Video Coding (Draft 3)," ISO/IEC JTC1/SC29/WG11 JVET-L1001, Oct. 2018. (235 pages).
Zhang et al., "CE4: History-based Motion Vector Prediction (Test 4.4.7)," ISO/IEC JTC1/SC29/WG11 JVET-L0266, Oct. 2018. (6 pages).
Hsiao et al., "CE4.4.12: Pairwise average candidates," ISO/IEC JTC1/SC29/WG11 JVET-L0090, Oct. 2018. (18 pages).
Chiang, et al., "CE10.1.1: Multi-hypothesis prediction for improving AMVP mode, skip or merge mode, and intra mode," ISO/IEC JTC1/SC29/WG11 JVET-L0100, Oct. 2018. (14 pages).
Xu, et al., Intra Block Copy in HEVC Screen Content Coding Extensions,, IEEE J. Emerg. Sel. Topics Circuits Syst., vol. 6, No. 4, pp. 409-419, 2016. (11 pages).
Xu, et al., "CE8-2.2: Current picture referencing using reference index signaling," JVET-K0076, 11th JVET meeting, Jul. 2018. (7 pages).
Xu, et al. "CE8: CPR mode with local search ranges (Test CE8.3.1 and CE8.3.2)," JVET-L0293, 12th JVET meeting, Oct. 2018. (5 pages).

* cited by examiner

METHOD AND APPARATUS FOR SIGNALING OF MULTI-HYPOTHESIS FOR SKIP AND MERGE MODE AND SIGNALING OF DISTANCE OFFSET TABLE IN MERGE WITH MOTION VECTOR DIFFERENCE

INCORPORATION BY REFERENCE

This present disclosure claims the benefit of priority to U.S. Provisional Application No. 62/779,407, "METHODS OF SIGNALING OF MULTI-HYPOTHESIS FOR SKIP/MERGEMODE" filed on Dec. 13, 2018, and U.S. Provisional Application No. 62/782,848, "METHODS OF SIGNALING OF DISTANCE OFFSET TABLE IN MERGE WITH MOTION VECTOR DIFFERENCE" filed on Dec. 20, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

According to an exemplary embodiment, a method of video decoding performed in a video decoder includes receiving a coded video bitstream including signaling information for a current block. The method further includes determining block reconstruction information for the current block based on the signaling information. The method further includes reconstructing the current block using the determined block reconstruction information.

According to an exemplary embodiment, a video decoder for video decoding includes processing circuitry configured to receive a coded video bitstream including signaling information for a current block. The processing circuitry is further configured to determine block reconstruction information for the current block based on the signaling information. The processing circuitry is further configured to reconstruct the current block using the determined block reconstruction information.

According to an exemplary embodiment, a non-transitory computer readable medium having instructions stored therein, which when executed by a processor in a video decoder causes the processor to execute a method comprising receiving a coded video bitstream including signaling information for a current block; determining block reconstruction information for the current block based on the signaling information; and reconstructing the current block using the determined block reconstruction information.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 2:
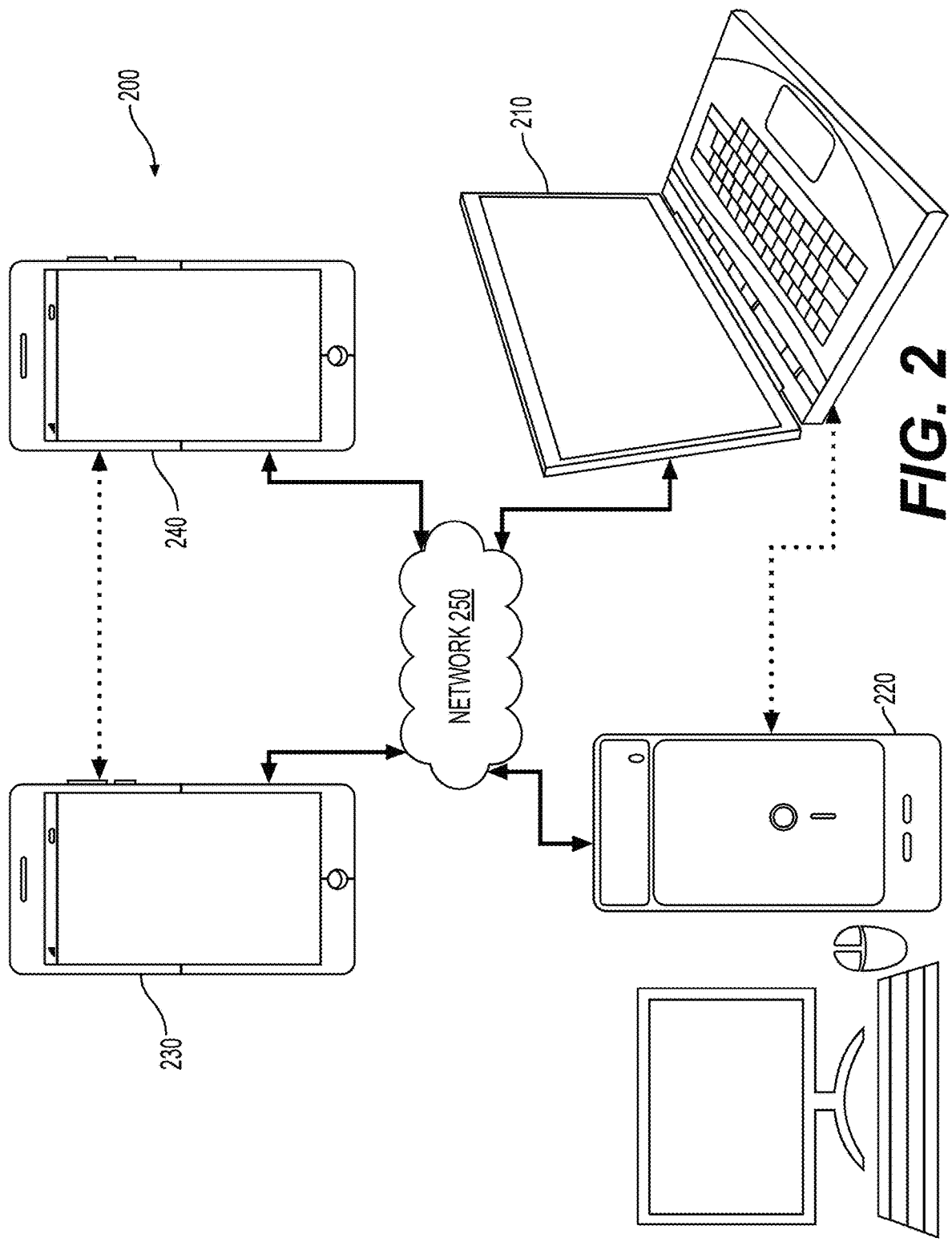
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
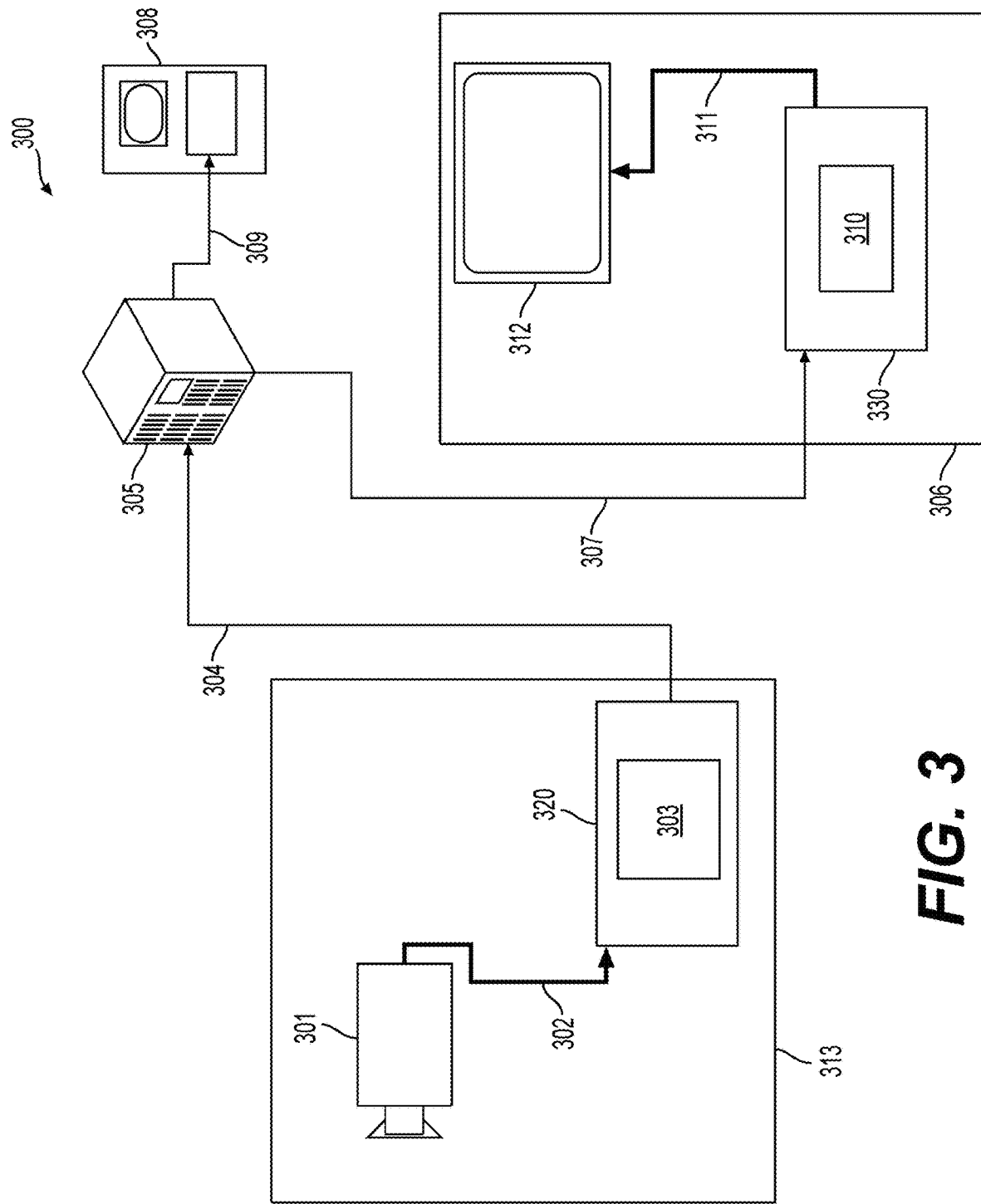
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
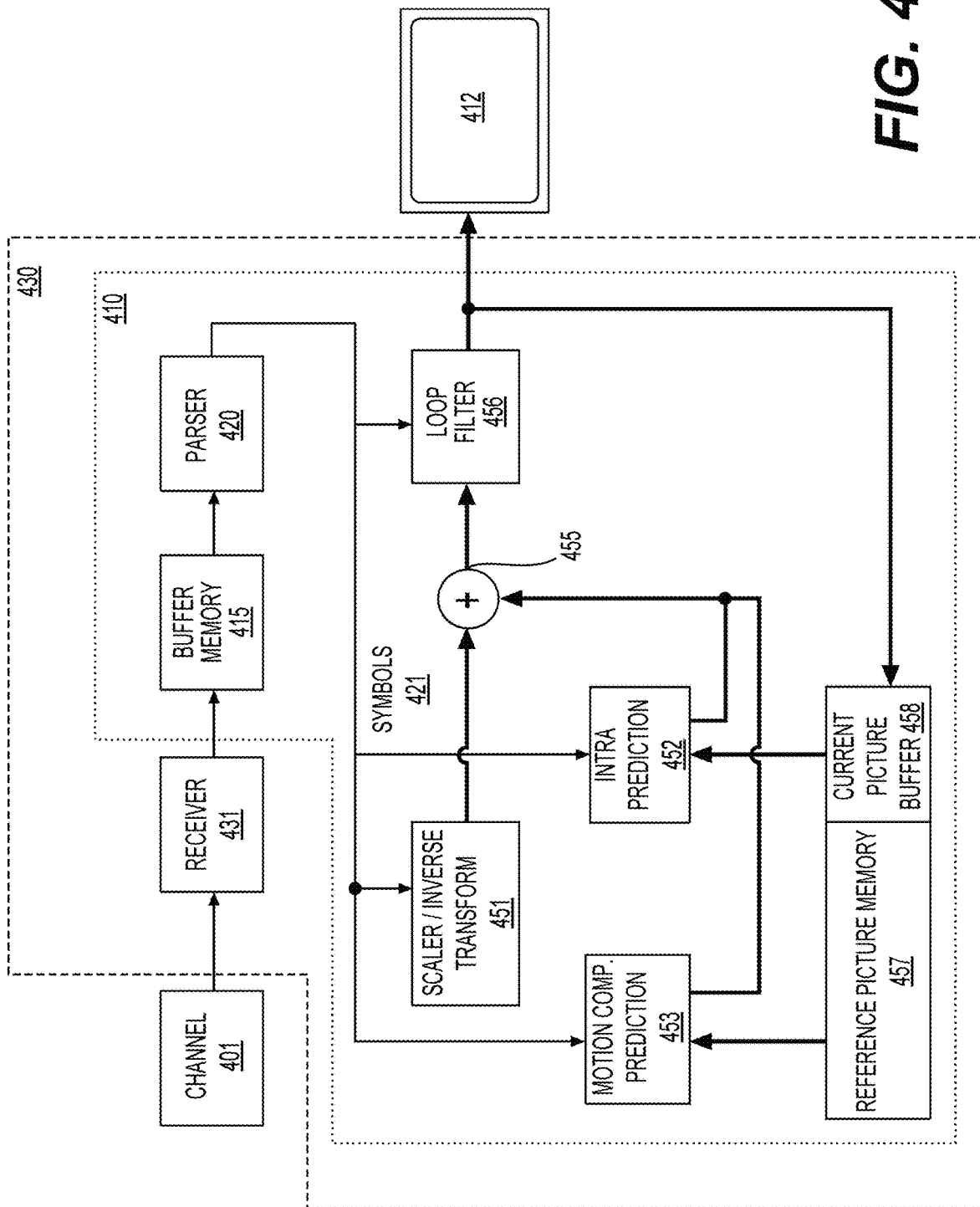
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
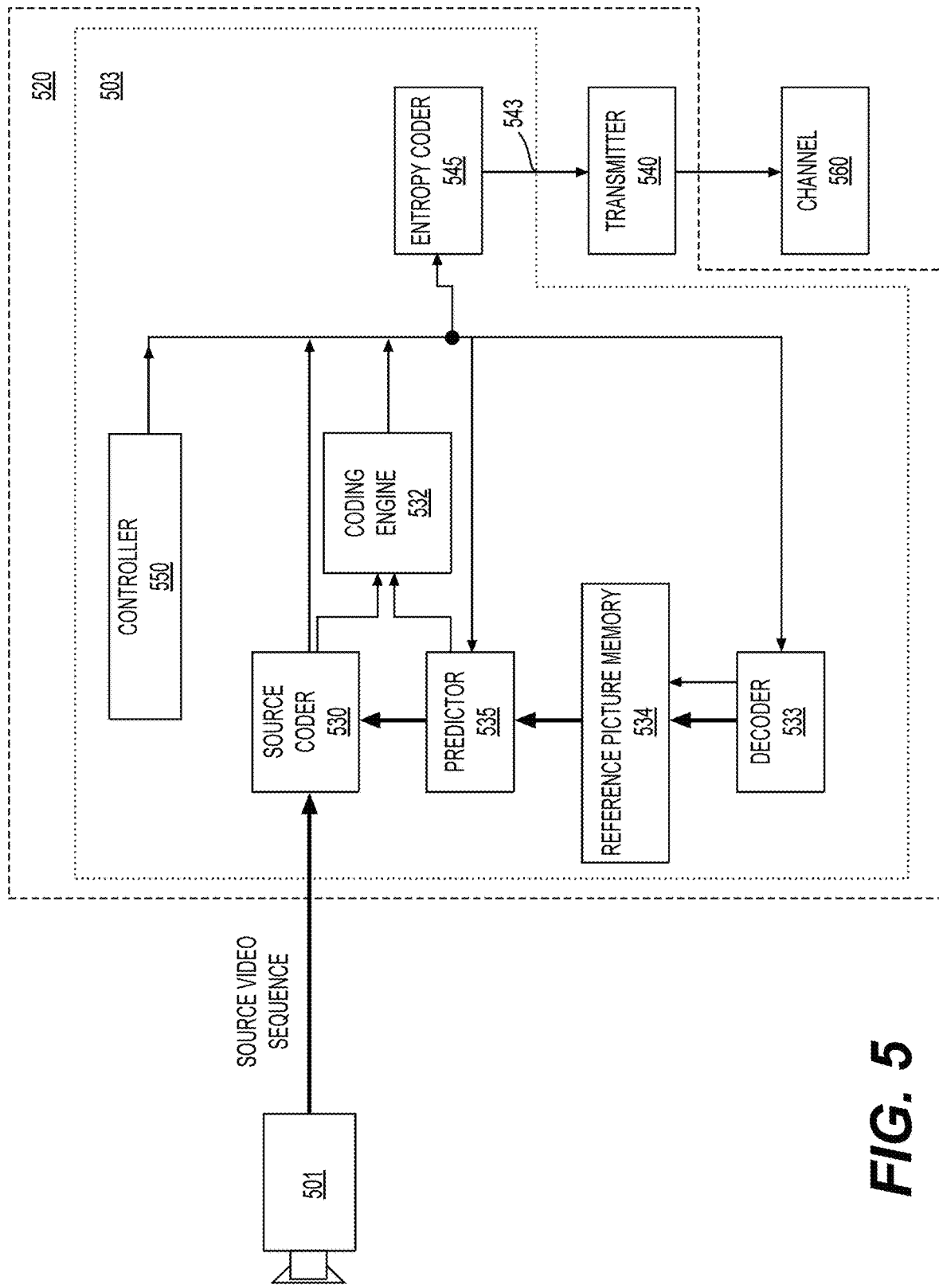
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
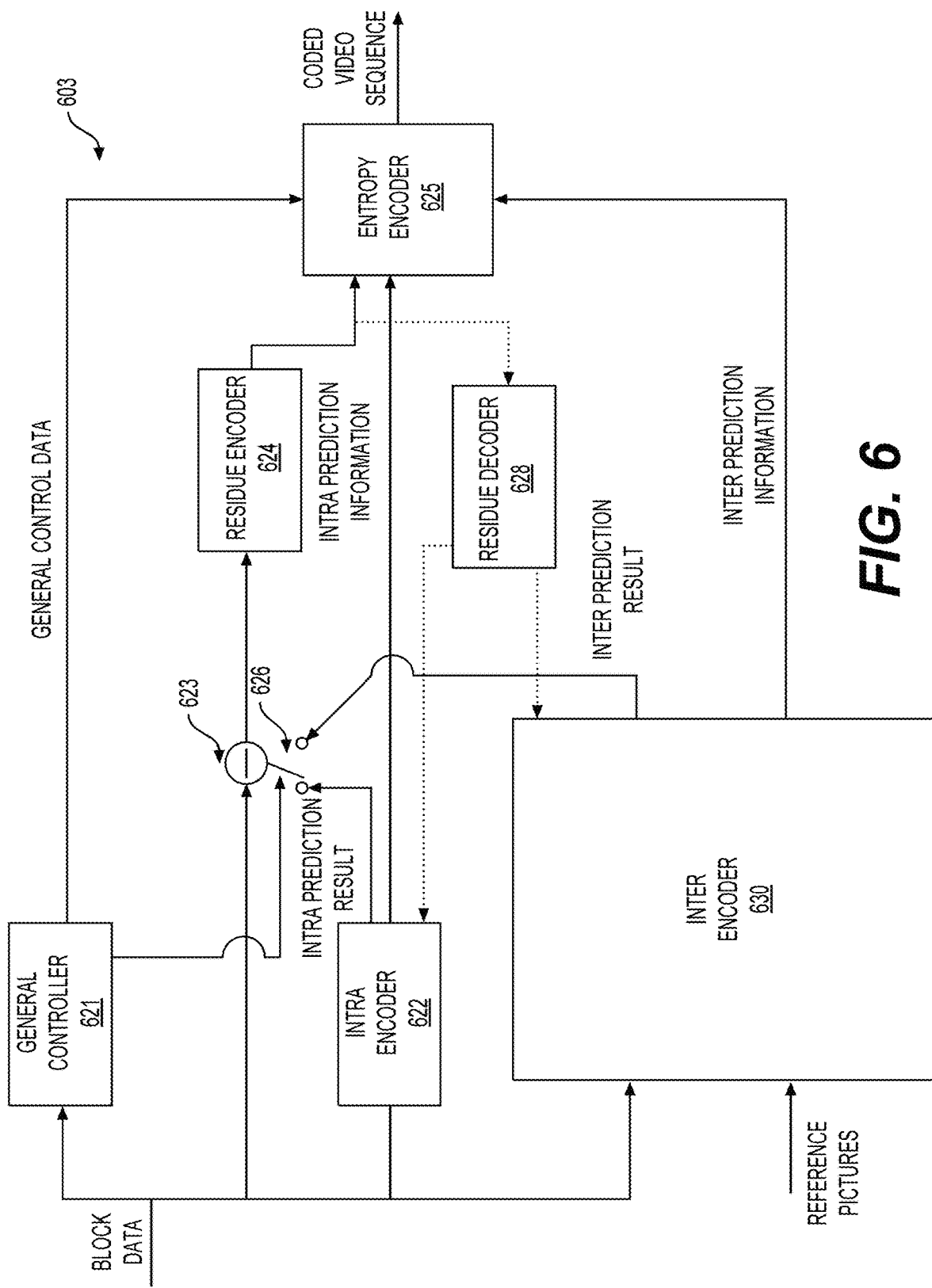
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
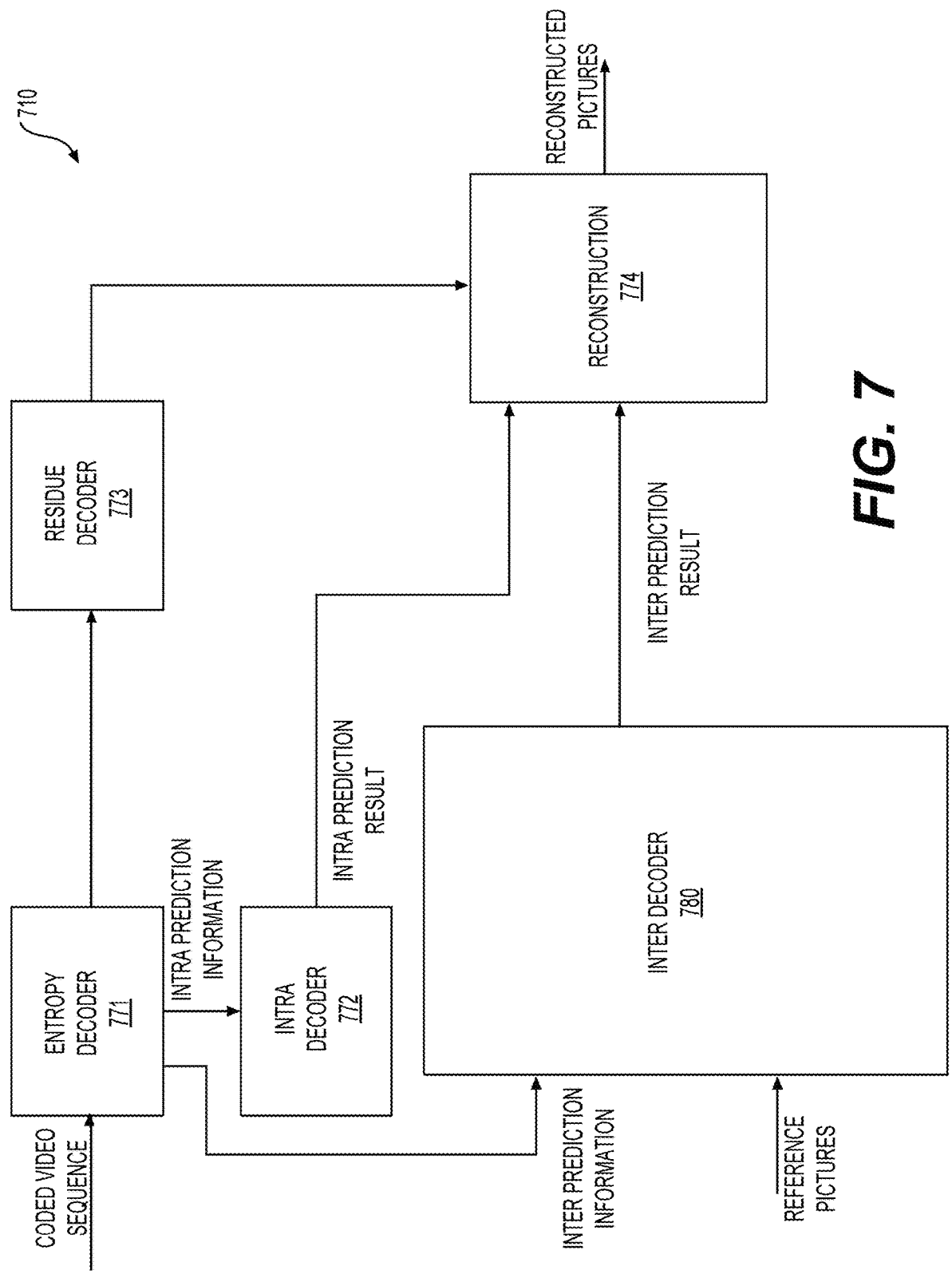
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

According to some embodiments, an AF MERGE mode may be applied for CUs with both width and height larger than or equal to 8. In this mode, the control point motion vectors (CPMVs) of the current CU may be generated based on motion information of spatial neighboring CUs. There may be up to five Control Point Motion Vector Predictor (CPMVP) candidates, and an index may be signalled to indicate the CPMVP to be used for the current CU.

In some embodiments, the following three types of CPMV candidate are used to form the affine merge candidate list: (i) inherited affine merge candidates that are extrapolated from the CPMVs of the neighbour CUs, (ii) constructed affine merge candidates CPMVPs that are derived using the translational MVs of the neighbour CUs, and (ii) zero MVs.

Figure 1:
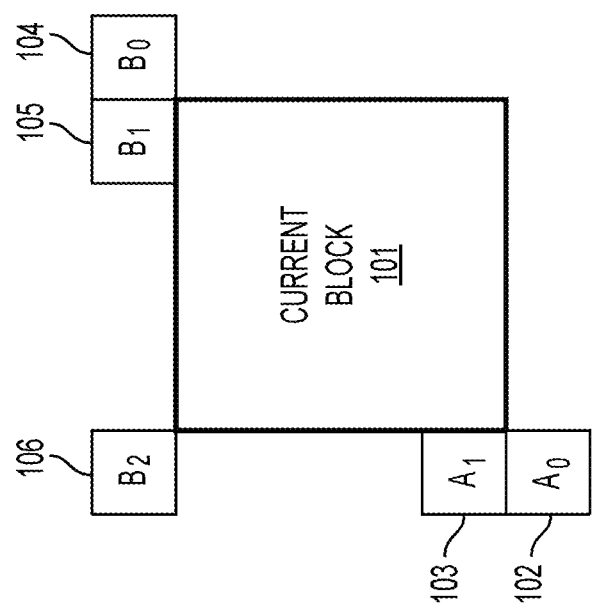
FIG. 1 is a schematic illustration of a current block and its surrounding spatial merge candidates in one example.
Figure 8:
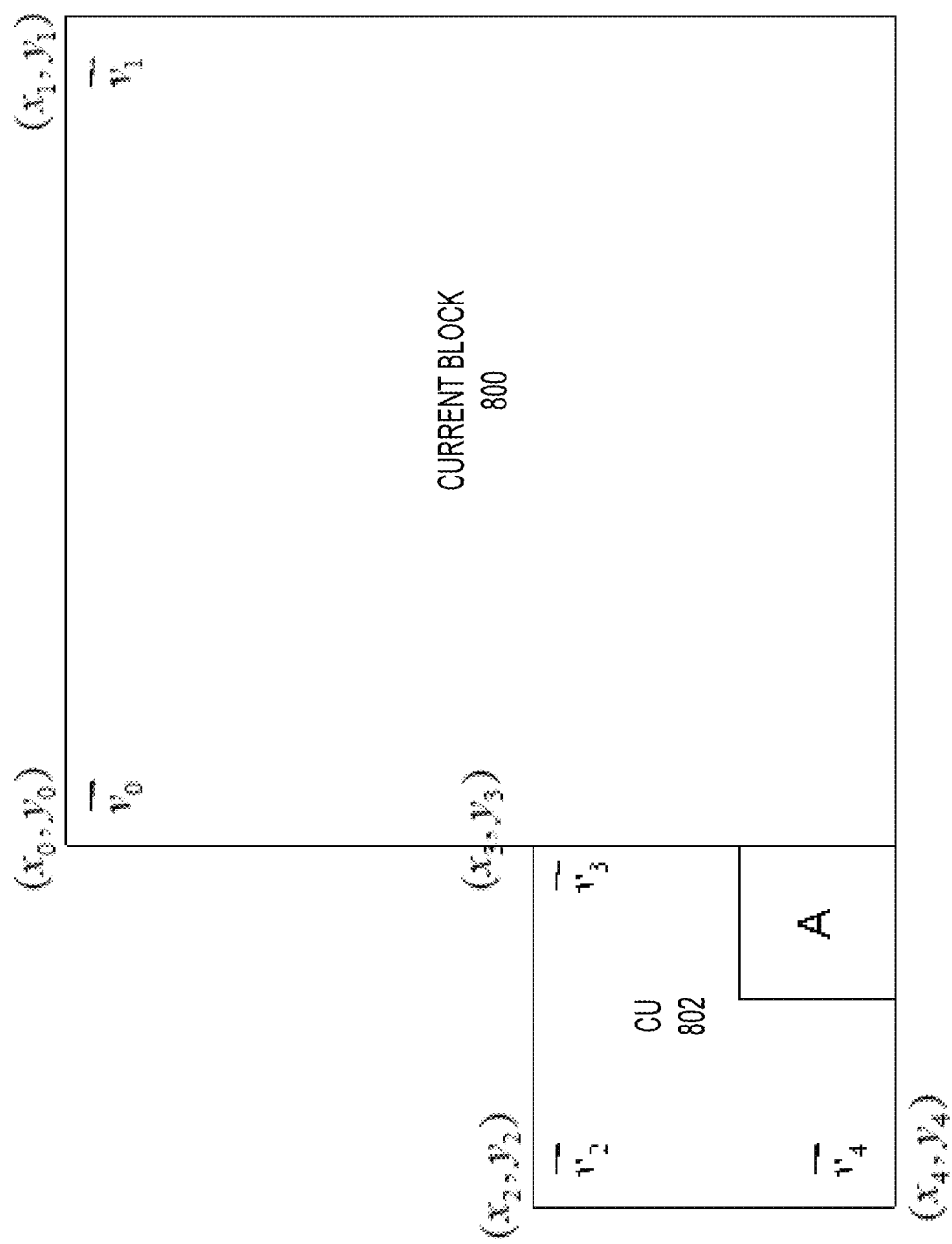
FIG. 8 is a schematic illustration of control point motion vector inheritance in accordance with an embodiment.

According to some embodiments, there may be a maximum of two inherited affine candidates, which may be derived from an affine motion model of the neighboring blocks. These two inherited candidates may include one from the left neighboring CUs and one from the above neighboring CUs. As an example, the candidate blocks may be the candidate blocks illustrated in FIG. 1. For the left predictor, a scan order may be A0-A1, and for the above predictor, the scan order may be B0→B1→B2. In some embodiments, only the first inherited candidate from each side is selected, and no pruning check is performed between two inherited candidates. When a neighboring affine CU is identified, this CU's control point motion vectors may be used to derive the CPMVP candidate in the affine merge list of the current CU. As shown in FIG. 8, which illustrates current block 800, if a neighbour left bottom block A is coded in affine mode, the motion vectors $v_2$, $v_3$ and $v_4$ of the top left corner, above right corner and left bottom corner of the CU 802, which contains the block A, are attained. When block A is coded with a 4-parameter affine model, the two CPMVs of the current CU may be calculated according to $v_2$, and $v_3$. If block A is coded with a 6-parameter affine model, the three CPMVs of the current CU may be calculated according to $v_2$, $v_3$ and $v_4$.

Figure 9:
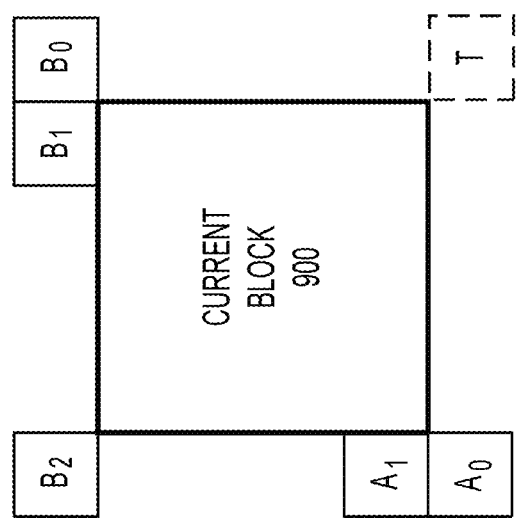
FIG. 9 is a schematic illustration of locations of candidate positions for constructed affine merge mode in accordance with an embodiment.

According to some embodiments, a constructed affine candidate may be constructed by combining the neighbor translational motion information of each control point. The motion information for the control points may be derived from the specified spatial neighbors and temporal neighbor (i.e., "T") of current block 900, as shown in FIG. 9. $CPMV_k$ (k=1, 2, 3, 4) may represent the k-th control point. For $CPMV_1$, the B2→B3→A2 blocks may be checked, and the MV of the first available block may be used. For $CPMV_2$, the B1→B0 blocks may be checked, and for $CPMV_3$, the A1→A0 blocks may be checked. TMVP may be used as $CPMV_4$ if TMVP is available.

In some embodiments, after MVs of four control points are attained, affine merge candidates may be constructed based on the motion information for these control points. The following example combinations of control point MVs may be used to construct a block: $\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, and $\{CPMV_1, CPMV_3\}$ A combination of 3 CPMVs constructs a 6-parameter affine merge candidate, and the combination of 2 CPMVs constructs a 4-parameter affine merge candidate. In some embodiments, to avoid a motion scaling process, if the reference indices of control points are different, the related combination of control point MVs is discarded.

According to some embodiments, a sub-block based temporal motion vector prediction (SbTMVP) method, similar to the temporal motion vector prediction (TMVP) in HEVC, can use the motion field in the collocated picture to improve motion vector prediction and merge mode for CUs in the current picture. The same collocated picture used by TMVP may be used for SbTVMP. SbTMVP differs from TMVP in the following two main aspects: (1) TMVP predicts motion at the CU level but SbTMVP predicts motion at sub-CU level; and (2) whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 10:
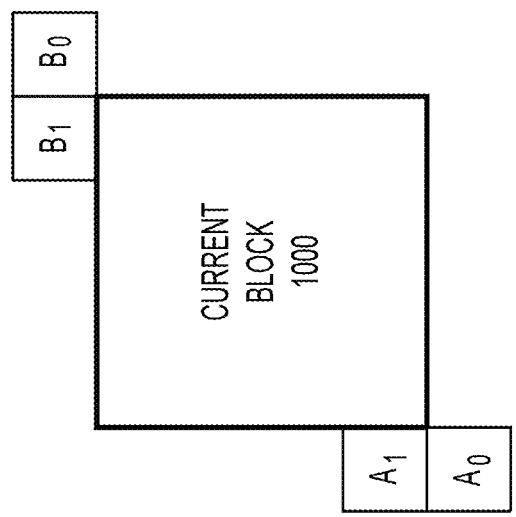
FIG. 10 is a schematic illustration of spatial neighboring blocks used by subblock-based temporal MV prediction (SbTMVP) in accordance with an embodiment.
Figure 11:
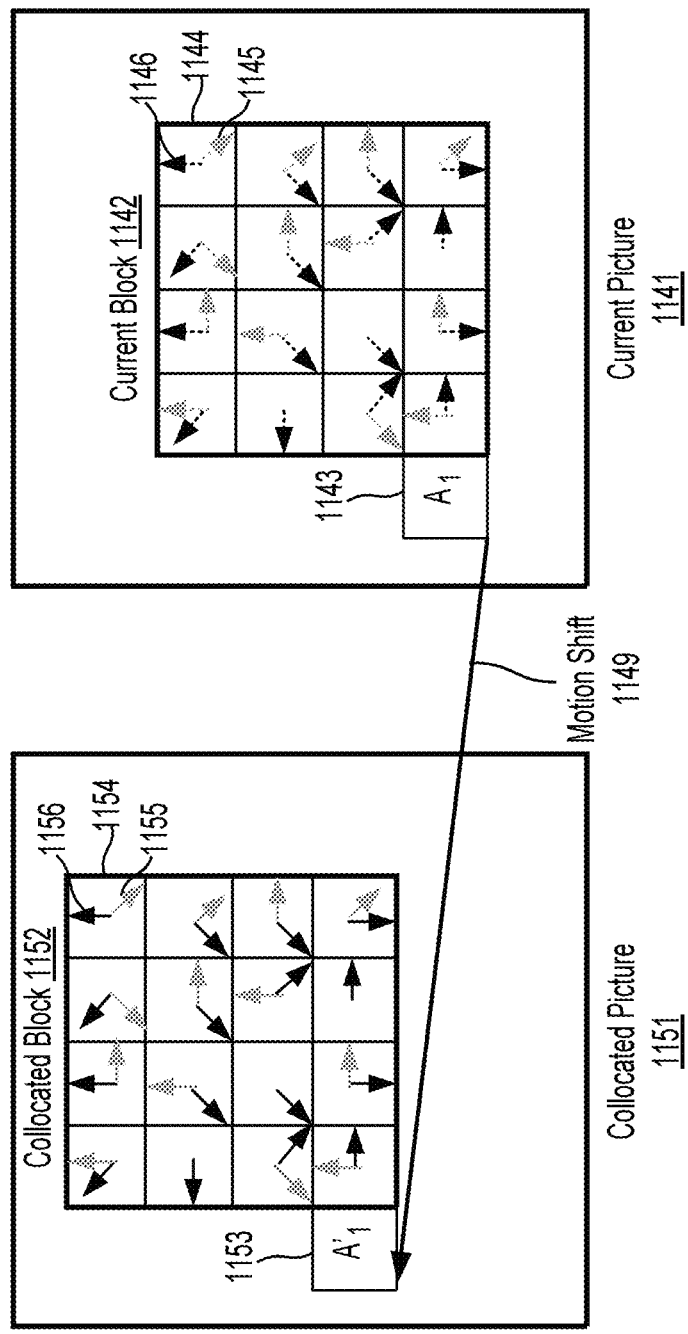
FIG. 11 is a schematic illustration of deriving a sub-CU motion field in accordance with an embodiment.

The SbTVMP process is illustrated in FIGS. 10 and 11. In some embodiments SbTMVP predicts the motion vectors of the sub-CUs within the current CU in two steps. In the first step, as shown in FIG. 10, the spatial neighbors of a current block (1000) are examined in the order of A1, B1, B0, and A0. Once the first available spatial neighboring block that has a motion vector that uses the collocated picture as its reference picture is identified, this motion vector is selected to be the motion shift to be applied. If no such motion vector is identified from the spatial neighbors, then the motion shift is set to (0, 0).

In the second step, the motion shift identified in the first step is applied (i.e., added to the coordinates of the current block) to obtain sub-CU-level motion information (e.g., motion vectors and reference indices) from the collocated picture as shown in FIG. 11. The example in FIG. 11 assumes the motion shift (1149) is set to the motion vector of the spatial neighboring block A1 (1143). Then, for a current sub-CU (e.g., sub-CU (1144)) in the current block (1142) of the current picture (1141), the motion information of a corresponding collocated sub-CU (e.g., collocated sub-CU (1154)) in the collocated block (1152) of the collocated picture (1151) is used to derive the motion information for the current sub-CU. The motion information of the corresponding collocated sub-CU (e.g., collocated sub-CU (1154)) is converted to the motion vectors and reference indices of the current sub-CU (e.g., sub-CU (1144)) in a similar way as the TMVP process in HEVC, where temporal motion scaling is applied to align the reference pictures of the temporal motion vectors to the reference picture of the current CU.

According to some embodiments, a combined sub-block based merge list which contains both a SbTVMP candidate and affine merge candidates can be used in sub-block based merge mode. The SbTVMP mode is enabled/disabled by a sequence parameter set (SPS) flag. If the SbTMVP mode is enabled, the SbTMVP predictor is added as the first entry of the sub-block based merge list, and followed by the affine merge candidates. The maximum allowed size of the sub-block based merge list is 5 in some applications. The sub-CU size used in SbTMVP is fixed to be 8×8, for example. As done for affine merge mode, SbTMVP mode is only applicable to a CU when both width and height are larger than or equal to 8.

The encoding logic of an additional SbTMVP merge candidate is the same as the encoding logic for other merge candidates. That is, for each CU in a P or B slice, an additional rate distortion (RD) check is performed to decide whether to use the SbTMVP candidate.

Figure 12A:
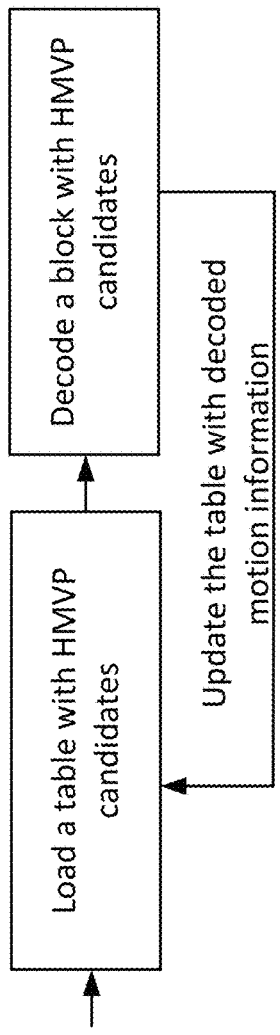
FIG. 12A is an illustration of a decoding flow chart for a history-based MV prediction (HMVP) buffer.

According to some embodiments, a history-based MVP (HMVP) method includes a HMVP candidate that is defined as the motion information of a previously coded block. A table with multiple HMVP candidates is maintained during the encoding/decoding process. The table is emptied when a new slice is encountered. Whenever there is an inter-coded non-affine block, the associated motion information is added to the last entry of the table as a new HMVP candidate. The coding flow of the HMVP method is depicted in FIG. 12A.

Figure 12B:
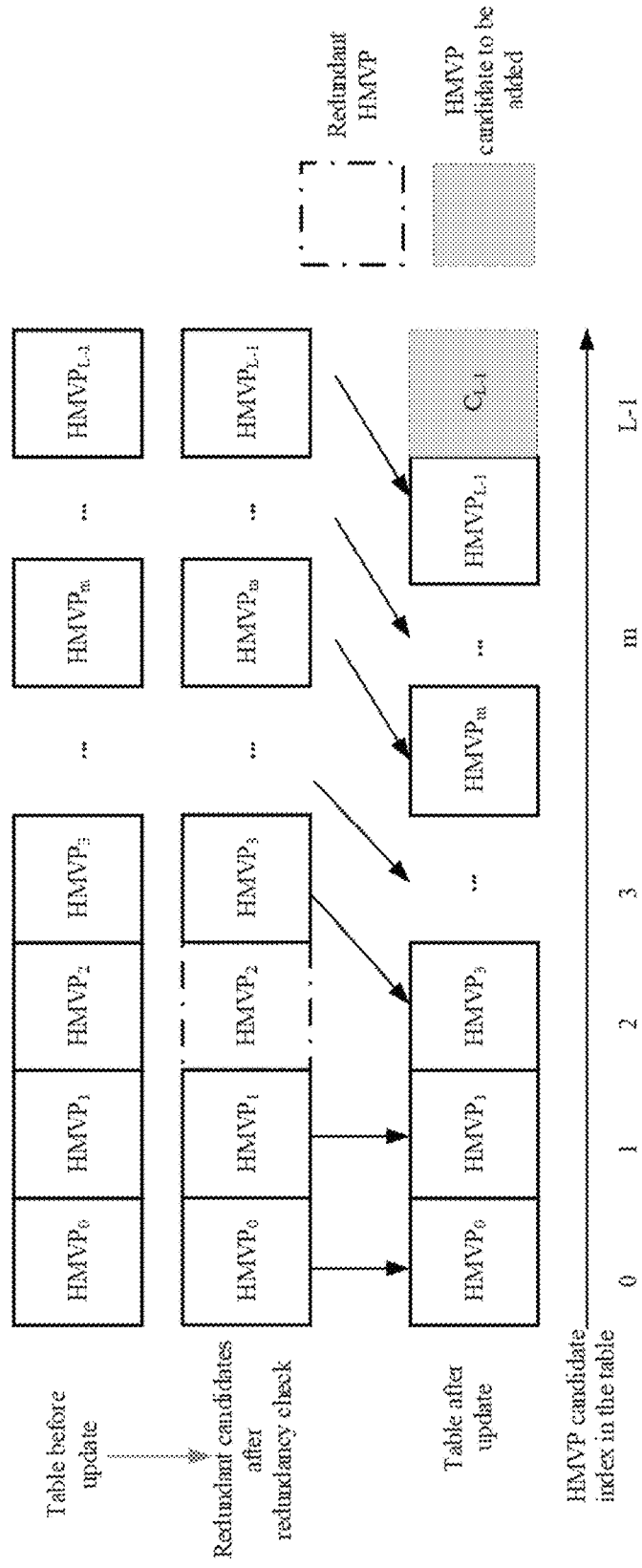
FIG. 12B is a schematic illustration of updating a HMVP buffer.

The table size S is set to be 6, which indicates up to 6 HMVP candidates may be added to the table. When inserting a new motion candidate into the table, a constrained FIFO rule is utilized such that a redundancy check is first applied to determine whether an identical HMVP is in the table. If found, the identical HMVP is removed from the table and all the HMVP candidates afterwards are moved forward, i.e., with indices reduced by 1. FIG. 12B shows an example of inserting a new motion candidate into the HMVP table.

HMVP candidates may be used in the merge candidate list construction process. The latest several HMVP candidates in the table are checked in order and inserted into the candidate list after the TMVP candidate. Pruning may be applied on the HMVP candidates to the spatial or temporal merge candidate excluding sub-block motion candidate (i.e., ATMVP).

In some embodiments, to reduce the number of pruning operations, the number of HMPV candidates to be checked (denoted by L) is set as L=(N<=4)?M: (8−N), where N indicates a number of available non-sub-block merge candidates and M indicates a number of available HMVP candidates in the table. In addition, once the total number of available merge candidates reaches the signaled maximally allowed merge candidates minus 1, the merge candidate list construction process from the HMVP list is terminated. Furthermore, the number of pairs for combined bi-predictive merge candidate derivation is reduced from 12 to 6.

HMVP candidates could also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates. In some applications, K is set to 4 while the AMVP list size is kept unchanged, i.e., equal to 2.

According to some embodiments, pairwise average candidates may be generated by averaging predefined pairs of candidates in the current merge candidate list. In some examples, the number of pairwise average candidates is 6, and the predefined pairs are defined as {(0, 1), (0, 2), (1, 2), (0, 3), (1, 3), (2, 3)}, where the numbers denote the merge indices to the merge candidate list. The averaged motion vectors may be calculated separately for each reference list. If both motion vectors are available in one list, these two motion vectors may be averaged even when they point to different reference pictures. If only one motion vector is available, the one motion vector may be directly used. If no motion vector is available, this list may be considered as invalid. The pairwise average candidates can replace the combined candidates in the HEVC standard.

Current picture referencing may sometimes be referred to as intra block copy, where a motion vector refers to the already reconstructed reference samples in the current picture. CPR is supported in HEVC screen content coding extension (HEVC SCC). A CPR-coded CU may be signaled as an inter coded block. The luma motion (or block) vector of a CPR-coded CU may be in integer precision. The chroma motion vector may also be clipped to integer precision.

In some embodiments, when combined with AMVR, the CPR mode can switch between 1-pel and 4-pel motion vector precisions. The current picture may be placed at the end of the reference picture list L0. To reduce memory consumption and decoder complexity, the CPR may only allow the reconstructed portion of the current CTU to be used, which allows the CPR mode to be implemented using local on-chip memory for hardware implementations.

In some embodiments, at the encoder side, hash-based motion estimation may be performed for CPR. The encoder may perform RD check for blocks with either a width or height no larger than 16 luma samples. For the non-merge mode, the block vector search may be performed using hash-based search first. If the hash search does not return a valid candidate, a block matching based local search may be performed.

In some embodiments, in the hash-based search, hash key matching (32-bit CRC) between the current block and a reference block may be extended to all allowed block sizes. The hash key calculation for every position in the current picture may be based on 4×4 sub-blocks. For the current block of a larger size, a hash key may be determined to match that of the reference block when all the hash keys of all 4×4 sub-blocks match the hash keys in the corresponding reference locations. If hash keys of multiple reference blocks are found to match that of the current block, the block vector costs of each matched reference may be calculated, and the matched reference with the minimum cost is selected.

In some embodiments, in a block matching search, the search range may set to be N samples to the left and on top of the current block within the current CTU. At the beginning of a CTU, the value of N is initialized to 128 if there is no temporal reference picture, and initialized to 64 if there is at least one temporal reference picture. A hash hit ratio may be defined as the percentage of samples in the CTU that found a match using hash-based search. While encoding the current CTU, if the hash hit ratio is below 5%, N is reduced by half.

Multi-hypothesis prediction methods may be used to improve existing prediction modes in inter pictures, including uni-prediction of advanced motion vector prediction (AMVP) mode, skip and merge mode, and intra mode. Multi-hypothesis prediction methods may combine an existing prediction mode with an extra merge indexed prediction. The merge indexed prediction may be performed as in merge mode, where a merge index may be signaled to acquire motion information for the motion compensated prediction. The final prediction may be the weighted average of the merge indexed prediction and the prediction generated by the existing prediction mode, where different weights are applied depending on the combinations.

In some embodiments, multi-hypothesis prediction may be applied to improve uni-prediction of AMVP mode. One flag is signaled to enable or disable multi-hypothesis prediction. Moreover, one additional merge index is signaled when the flag is true. In this way, multi-hypothesis prediction turns uni-prediction into bi-prediction, where one prediction is acquired using the original syntax elements in AMVP mode while the other prediction is acquired using the merge mode. The final prediction uses 1:1 weights to combine these two predictions as in bi-prediction. The merge candidate list is first derived from merge mode with sub-CU candidates (e.g., affine, alternative temporal motion vector prediction (ATMVP)) excluded. Next, the merge candidate list is separated into two individual lists, one for list 0 (L0) containing all L0 motions from the candidates, and the other for list 1 (L1) containing all L1 motions. After removing redundancy and filling vacancy, two merge lists are generated for L0 and L1, respectively. There are two constraints when applying multi-hypothesis prediction for improving AMVP mode. First, it is enabled for those CUs with the luma coding block (CB) area larger than or equal to 64. Second, it is only applied to L1 for low delay B pictures.

In some embodiments, when the multi-hypothesis prediction is applied to a skip or merge mode, the enablement of the multi-hypothesis prediction may be explicitly signaled. An extra merge indexed prediction may be selected in addition to the original one. Therefore, each candidate of multi-hypothesis prediction implies a pair of merge candidates, containing one for the 1st merge indexed prediction and the other for the 2nd merge indexed prediction. However, in each pair, the merge candidate for the 2nd merge indexed prediction may be implicitly derived as the succeeding merge candidate (i.e., the already signaled merge index plus one) without signaling any additional merge index. After removing redundancy by excluding those pairs, containing similar merge candidates and filling vacancy, the candidate list for multi-hypothesis prediction is formed. Then, motion vectors from a pair of two merge candidates may be acquired to generate the final prediction, where 5:3 weights may be applied to the 1st and 2nd merge indexed predictions, respectively. Furthermore, a merge or skip CU with multi-hypothesis prediction enabled can save the motion information of the additional hypotheses for reference of the following neighboring CUs in addition to the motion information of the existing hypotheses. Sub-CU candidates (e.g., affine, SbTMVP) may be excluded from the candidate list, and for low delay B pictures, multi-hypothesis prediction may not be applied to the skip mode. Moreover, when multi-hypothesis prediction is applied to the merge or skip mode, for those CUs with CU width or CU height less than 16, or those CUs with both CU width and CU height equal to 16, bi-linear interpolation filter may be used in motion compensation for multiple hypotheses.

According to some embodiments, when the multi-hypothesis prediction is applied to improve an intra prediction mode, multi-hypothesis prediction combines one intra prediction and one merge indexed prediction. In a merge mode CU, one flag may be signaled for the merge mode to select an intra mode from an intra candidate list when the flag is true.

In some embodiments, for the luma component, the intra candidate list is derived from 4 intra prediction modes including DC, planar, horizontal, and vertical modes, and the size of the intra candidate list may be 3 or 4 depending on the block shape. For example, when the CU width is two times larger than the CU height, the horizontal mode is excluded from the intra candidate list, and when the CU height is two times larger than the CU width, the vertical mode is excluded from the intra candidate list. In some embodiments, one intra prediction mode candidate selected in accordance with an intra mode index and one merge mode prediction candidate selected in accordance with a merge index are combined using a weighted average. In some embodiments, for the chroma component, the direct mode (DM) is applied without extra signaling.

According to some embodiments, the weights for combining predictions may be implemented as follows. When the DC or planar mode is selected, or the CB width or height is smaller than 4, equal weights are applied to the intra and inter prediction candidates. For those CBs with a CB width and height larger than or equal to 4, when the horizontal/vertical mode is selected, one CB may be first vertically or horizontally split into four equal-area regions. Each weight set, denoted as $(w\_intra_i, w\_inter_i)$, where i is from 1 to 4, may be implemented as follows: $(w\_intra_1, w\_inter_1)=(6, 2)$, $(w\_intra_2, w\_inter_2)=(5, 3)$, $(w\_intra_3, w\_inter_3)=(3, 5)$, and $(w\_intra_4, w\_inter_4)=(2, 6)$. These weight sets may be applied to a corresponding region, where $(w\_intra_1, w\_inter_1)$ is for the region closest to the reference samples, and $(w\_intra_4, w\_inter_4)$ is for the region farthest away from the reference samples. After the weight sets are applied to a corresponding region, the combined prediction may be calculated by summing up the two weighted predictions and right-shifting 3 bits. Furthermore, the intra prediction mode for the intra hypothesis of predictors may be saved for reference by the following neighboring CUs.

Figure 13:
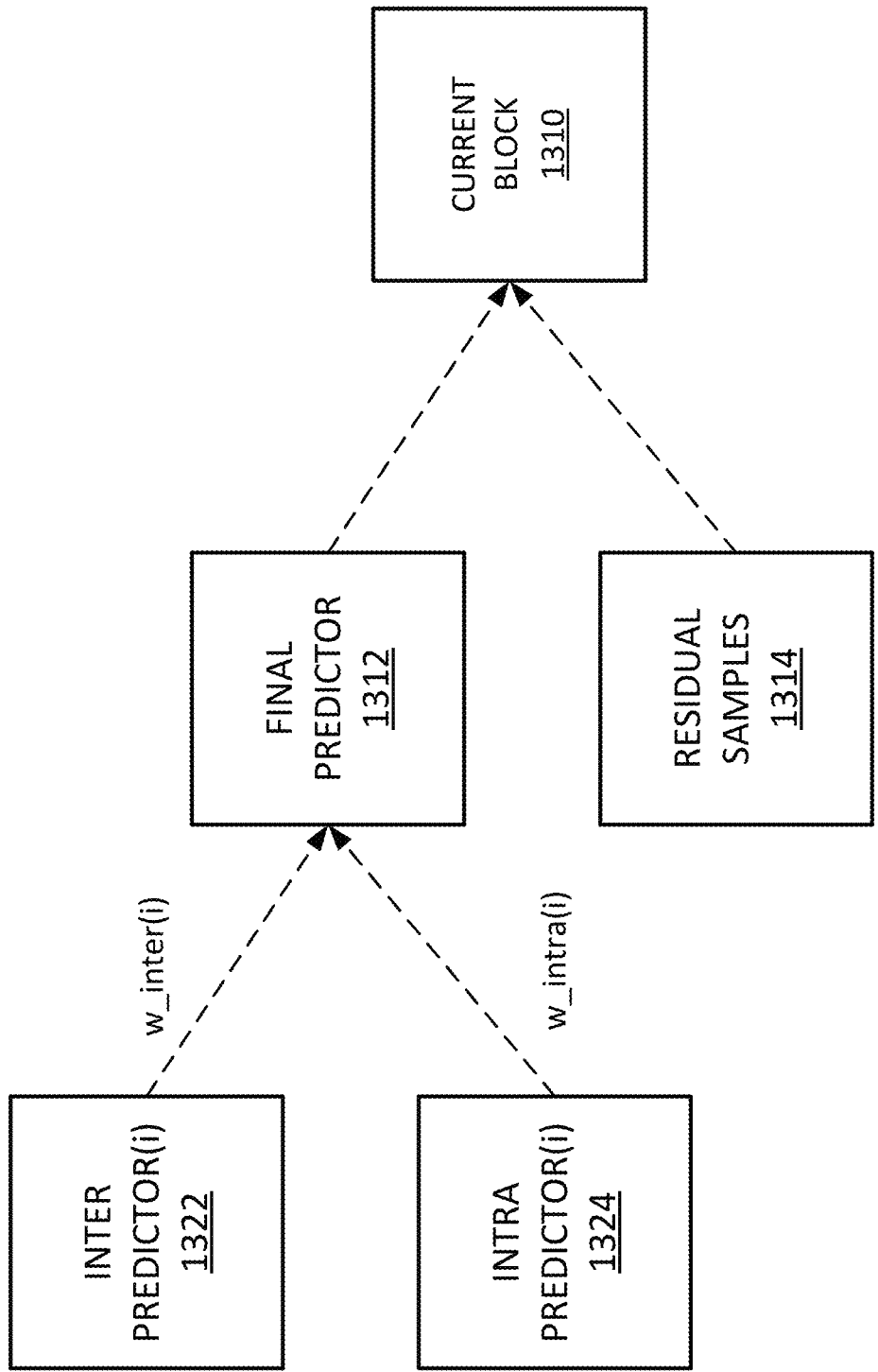
FIG. 13 is a schematic illustration of blocks with applied weighting factors in accordance with an embodiment.

FIG. 13 illustrates an example of multi-hypothesis prediction. Inter Predictor (i) (1322) and Intra Predictor (i) (1324) correspond to the inter prediction and intra prediction parts for the $i^{th}$ region. The weights w_inter(i) and w_intra(i) correspond to the inter prediction and intra prediction weights, respectively, for the $i^{th}$ region. The Final Predictor (1312) may be formed by combining the weighted Inter Predictor (1322) and Intra Predictor (1324). A current block (1310) may be reconstructed using the final predictor (1312) and residual samples (1314). The residual sample may represent a difference between the current block (1310) and the Final Predictor (1312).

In the multi-hypothesis prediction for the skip/merge mode, the maximum number of merge indexes to be signaled is smaller than the maximum number of candidates in the regular merge candidate list. However, the maximum number of candidates in regular merge candidate list is still used for a truncated unary coding of the merge index signaling for this multi-hypothesis prediction for skip/merge mode. Embodiments of the present disclosure improve this signaling.

According to embodiments of the present disclosure, the term block may be interpreted as a prediction block, a coding block, or a coding unit (i.e., CU). Embodiments of the present disclosure modify the current design of merge index signaling for multi-hypothesis prediction in skip/merge mode.

In some embodiments, when the multi-hypothesis prediction is applied to skip or merge mode, enablement of the multi-hypothesis prediction is performed through explicit signaling. If the multi-hypothesis prediction for skip/merge mode is enabled, a merge index may be signaled using truncated unary coding. Therefore, each signaled merge index may be used to imply a pair of merge candidates. For example, the signaled merge index may be used to for explicitly signaling a first merge candidate, and a second merge candidate may be derived from the signaled merge index (i.e., the already signaled merge index plus one).

According to some embodiments, max_num_candidates indicates a maximum allowed number of merge candidates for the merge candidate list. For inter merge/skip mode, the maximum value of the truncated unary binarization for the merge index may be (max_num_candidates−1). In some embodiments, if the multi-hypothesis prediction is enabled for the skip or merge mode, the maximum number of a merge index that may be signaled is (max_num_candidates−1) since each signaled merge index corresponds to two consecutive merge candidates on the list.

According to some embodiments, when merge flag is signaled as true for the current block, a usage flag is signaled to indicate whether multi-hypothesis prediction for skip/merge mode is enabled or not. If the usage flag is true, which indicates that the multi-hypothesis mode is enabled, the merge index is signaled in addition to the usage flag. The value of (max_num_candidates−2) may be used as a maximum value in the truncated unary binarization for the merge index coding.

In one example, the max_num_candidates equals to 6, and the usage flag for the binarization of the multi-hypothesis prediction for skip/merge mode is true. In this example, the maximum value for the merge index is 4 (i.e., max_num_candidates−2). The mapping of all possible merge index values and their corresponding unary code is listed in Table 1.

TABLE 1

Unary coded merge index

| Merge Index | Unary Code |
|---|---|
| 0 | 0 |
| 1 | 10 |
| 2 | 110 |
| 3 | 1110 |
| 4 | 11110 |

According to some embodiments, when the merge flag is signaled as true for the current block, the merge index is signaled subsequently. The value of (max_num_candidates−1) may be used as a maximum value for the truncated unary binarization in the merge index coding. Furthermore, when the value of merge index is less than (max_num_candidates−1), a usage flag is subsequently signaled to indicate whether the multi-hypothesis prediction for skip/merge mode is enabled. If the merge index value is larger than or equal to (max_num_candidates−1), the usage flag is implicitly set as false. For example, when the merge index value is larger than or equal to (max_num_candidates−1), the merge index value is considered to be invalid, and when this situation occurs, the decoder sets the usage flag to false, or treats the usage flag as false even if the usage flag is signaled as true.

According to some embodiments, for multi-hypothesis prediction to be available, a pair of merge candidates should be available in the merge candidate list. In some embodiments, when certain conditions are met, multi-hypothesis prediction is not available for the skip/merge mode.

In one embodiment, if a maximum allowed number of merge candidates for regular merge list is max_num_candidates, and this value is smaller than 2, multi-hypothesis prediction is not available for the skip/merge mode. Therefore, in this case, in some examples, the usage flag for multi-hypothesis prediction is not signaled, and is inferred to be false. In another example, when the max_num_candidates is less than 2, the usage flag for multi-hypothesis prediction is signaled as false (bitstream conformance requirement).

In some embodiments, if CPR mode is used, some of the merge candidates may be coded in CPR mode. If, for example, a combination of CPR coded block and regular inter coded block is not allowed in multi-hypothesis prediction, the following constraints should be met in some embodiments: when the number of available regular inter coded merge candidates is smaller than 2, the usage flag of multi-hypothesis prediction is signaled as false (bitstream conformance requirement).

In some embodiments, a merge with motion vector difference (MMVD) mode is used for determining a motion vector predictor of a current block. The MMVD mode can be used when skip mode or merge mode is enabled. The MMVD mode reuses merge candidates on a merge candidate list of the skip mode or merge mode. For example, a merge candidate selected from the merge candidate list can be used to provide a starting point at a reference picture. A motion vector of the current block can be expressed with the starting point and a motion offset including a motion magnitude and a motion direction with respect to the starting point. At an encoder side, selection of the merge candidate and determination of the motion offset can be based on a search process (an evaluation process). At a decoder side, the selected merge candidate and the motion offset can be determined based on signaling from the encoder side.

The MMVD mode can reuse a merge candidate list constructed in various inter prediction modes described herein. In some examples, only candidates of a default merge type (e.g., MRG_TYPE_DEFAULT_N) on the merge candidate list are considered for MMVD mode. Examples of the merge candidates of the default merge types can include (i) merge candidates employed in the merge mode, (ii) merge candidates from a history buffer in the HMVP mode, and (iii) pairwise average motion vector candidates as described herein. Merge candidates in the affine mode or SbTMVP mode are not used for expansion in MMVD mode in some examples.

A base candidate index (IDX) can be used to define the starting point. For example, a list of merge candidates (motion vector predicators (MVPs)) associated with indices from 0 to 3 is shown in Table 2. The merge candidate having an index of the base candidate index can be determined from the list, and used to provide the starting point.

TABLE 2

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

A distance index can be used to provide motion magnitude information. For example, a plurality of predefined pixel distances are shown in Table 3 each associated with indices from 0 to 7. The pixel distance having an index of the distance index can be determined from the plurality of pixel distances, and used to provide the motion magnitude.

TABLE 3

| Distance IDX | | | | | | | | |
|---|---|---|---|---|---|---|---|---|
| Distance IDX | | | | | | | | |
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

A direction index can be used to provide motion direction information. The direction index may represent a direction of the MVD relative to the starting point. For example, four directions with indices from 00 to 11 (binary) are shown in Table 4. The direction with an index of the direction index can be determined from the four directions, and used to provide a direction of the motion offset with respect to the starting point.

TABLE 4

| Direction IDX | | | | |
|---|---|---|---|---|
| Direction IDX | 00 | 01 | 10 | 11 |
| x-axis | + | − | N/A | N/A |
| y-axis | N/A | N/A | + | − |

MMVD syntax elements can be transmitted in a bit stream to signal a set of MMVD indices including a base candidate index, a direction index, and a distance IDX in the MMVD mode.

In some embodiments, an MMVD enable flag is signaled after sending a skip and merge flag for coding a current block. For example, when the skip and merge flag is true, the MMVD flag is parsed. When the MMVD flag is equal to 1, in an example, the MMVD syntax elements (the set of MMVD indices) are parsed. In one example, when the MMVD flag is not 1, a flag associated with another mode, such as an AFFINE flag, is parsed. When the AFFINE flag is equal to 1, the AFFINE mode is used for processing the current block. When the AFFINE flag is not 1, in an example, a skip/merge index is parsed for processing the current block with skip/merge mode.

Figure 14:
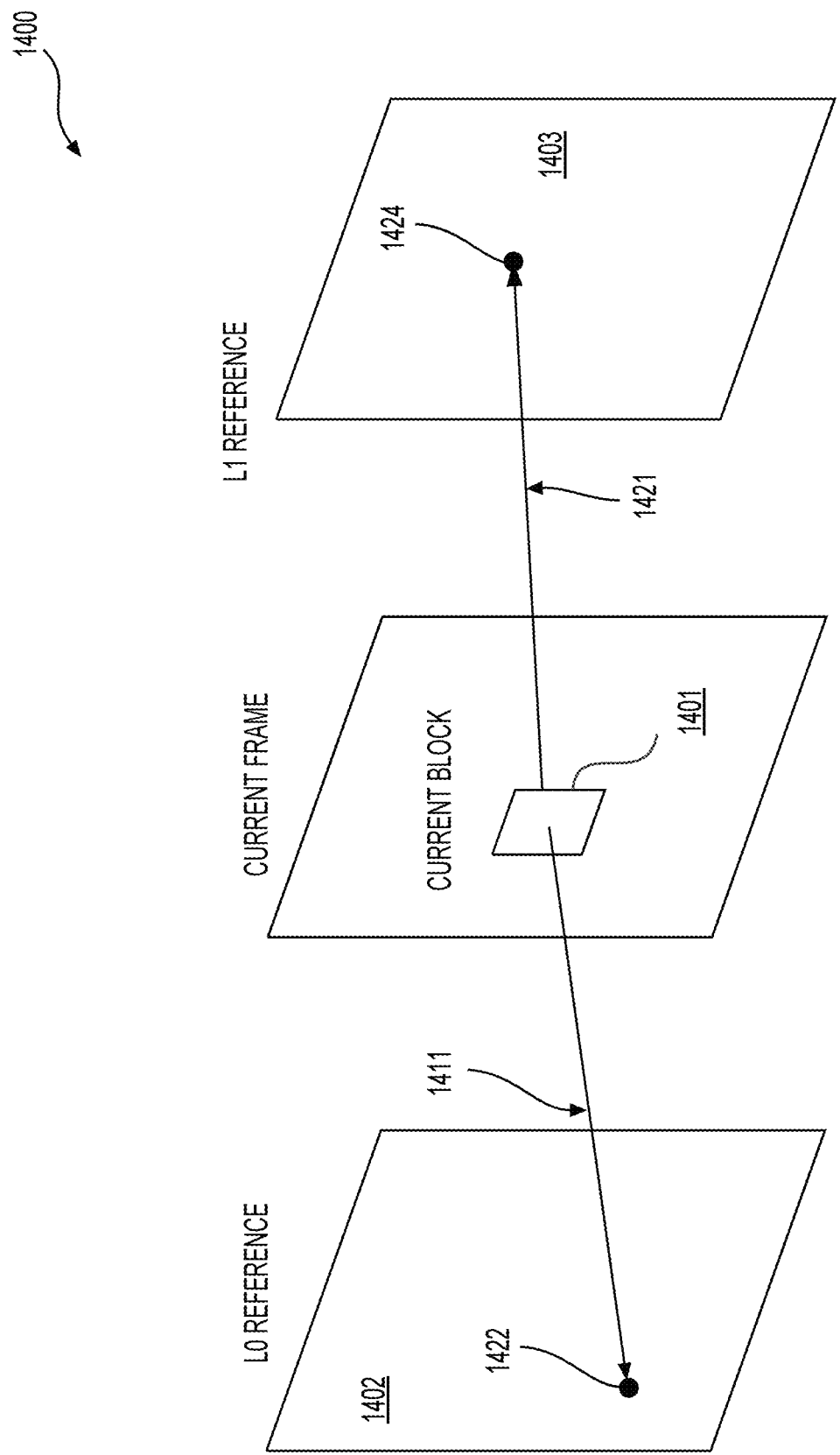
FIG. 14 is a schematic illustration of determining starting points at two reference pictures associated with two reference picture lists based on motion vectors of a merge candidate in a merge with motion vector difference (MMVD) mode in accordance with an embodiment.
Figure 15:
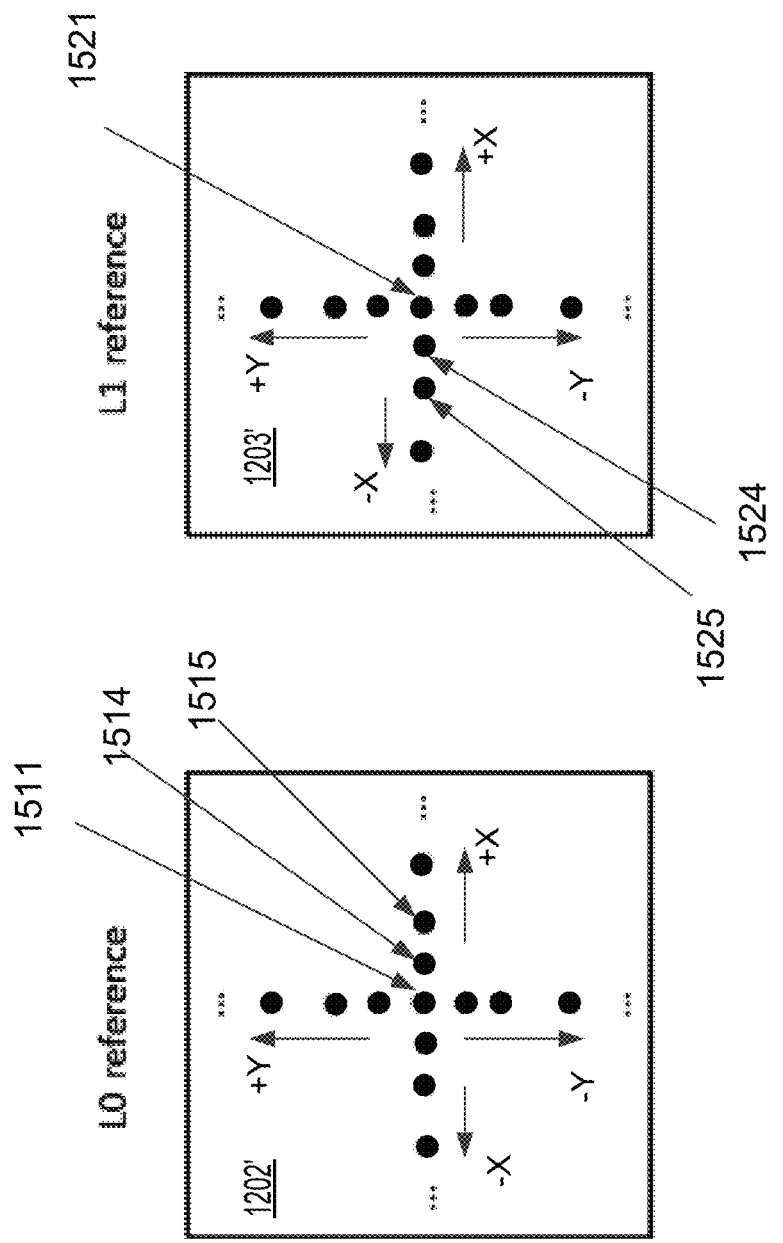
FIG. 15 is a schematic illustration of predetermined points surrounding two starting points that are to be evaluated in the MMVD mode in accordance with an embodiment.

FIGS. 14 and 15 show an example of a search process in MMVD mode according to an embodiment of the disclosure. By performing the search process, a set of MMVD indices including a base candidate index, a direction index, and a distance index can be determined for a current block (1401) in a current picture (or referred to as a current frame).

As shown in FIGS. 14 and 15, a first motion vector (1411) and a second motion vector (1421) belonging to a first merge candidate are shown. The first merge candidate can be a merge candidate on a merge candidate list constructed for the current block (1401). The first and second motion vectors (1411) and (1421) can be associated with two reference pictures (1402) and (1403) in reference picture lists L0 and L1, respectively. Accordingly, two starting points (1422) and (1424) in FIG. 14 can be determined at the reference pictures (1402) and (1403).

In an example, based on the starting points (1422) and (1424), multiple predefined points extending from the starting points (1422) and (1424) in vertical directions (represented by +Y, or −Y) or horizontal directions (represented by +X and −X) in the reference pictures (1402) and (1403) can be evaluated. In one example, a pair of points mirroring each other with respect to the respective starting point (1422) or (1424), such as the pair of points (1514) and (1524), or the pair of points (1515) and (1525), can be used to determine a pair of motion vectors which may form a motion vector predictor candidate for the current block (1401). Those motion vector predictor candidates determined based on the predefined points surrounding the starting points (1511) or (1521) can be evaluated.

In addition to the first merge candidate, other available or valid merge candidates on the merge candidate list of the current block (1401) can also be evaluated similarly. In one example, for a uni-predicted merge candidate, only one prediction direction associated with one of the two reference picture lists is evaluated.

Based on the evaluations, a best motion vector predictor candidate can be determined. Accordingly, corresponding to the best motion vector predictor candidate, a best merge candidate can be selected from the merge list, and a motion direction and a motion distance can also be determined. For example, based on the selected merge candidate and Table 2, a base candidate index can be determined. Based on the selected motion vector predictor, such as that corresponding to the predefined point (1515) (or (1525)), a direction and a distance of the point (1515) with respect to the starting point (1511) can be determined. According to Table 3 and Table 4, a direction index and a distance index can accordingly be determined.

It is noted that the examples described above are merely for illustrative purpose. In alternative examples, based on the motion vector expression method provided in the MMVD mode, the motion distances and motion directions may be defined differently. In addition, the evaluation process (search process) may be performed differently. For example, for a bi-prediction merge candidate, three types of prediction directions (e.g., L0, L1, and L0 and L1) may be evaluated based on a set of predefined distances and directions to select a best motion vector predictor. For another example, a uni-predicted merge candidate may be converted by mirroring or scaling to a bi-predicted merge candidate, and subsequently evaluated. In the above examples, an additional syntax indicating a prediction direction (e.g., L0, L1, or L0 and L1) resulting from the evaluation process may be signaled.

As described above, merge candidates on a merge candidate list are evaluated to determine a base candidate in the MMVD mode at an encoder. At a decoder, using a base candidate index as input, a motion vector predictor can be selected from a merge candidate list. Accordingly, no additional line buffer is needed for the MMVD mode in addition to a line buffer for storage of the merge candidates.

Figure 16:
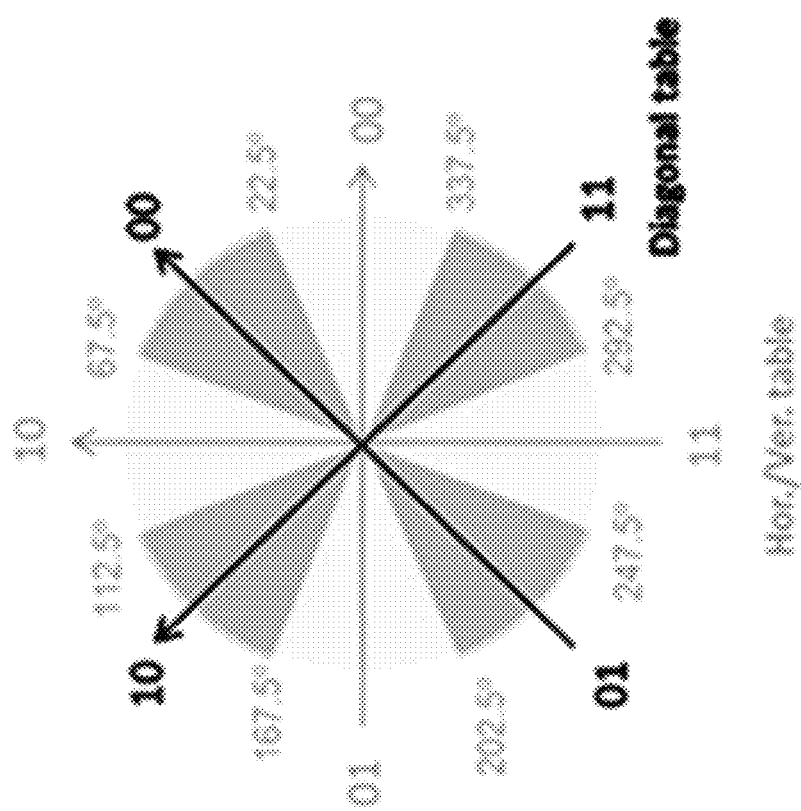
FIG. 16 is an illustration of a direction table selection in accordance with an embodiment.

In some embodiments, MMVD uses an additional table consisting of diagonal direction candidates as shown in Table 5. One of the hor./ver. table and diagonal table is selected according to the direction of base motion vector as shown in FIG. 16.

TABLE 5

| Direction table | | | | | |
|---|---|---|---|---|---|
| Direction IDX | | 00 | 01 | 10 | 11 |
| Hor./Ver. table | x-axis | + | − | N/A | N/A |
| | y-axis | N/A | N/A | − | + |
| Diagonal table | x-axis | + | − | + | − |
| | y-axis | + | − | − | + |

In some embodiments, MMVD uses an adaptive distance table based on a picture resolution. For example, if the picture resolution is not larger than 2K (i.e., 1920×1080), Table 6 is used as the base distance table, otherwise Table 7 is used as the base distance table.

TABLE 6

| MMVD distance table | | | | | | | |
|---|---|---|---|---|---|---|---|
| Distance IDX | | | | | | | |
| 0 | 1 | 2 | 3 | 4 | 5 | 6 | 7 |
| Pixel distance ¼-pel | ½-pel | 1-pel | 2-pel | 4-pel | 8-pel | 16-pel | 32-pel |

TABLE 7

| MMVD distance table | | | | | | | |
|---|---|---|---|---|---|---|---|
| Distance IDX | | | | | | | |
| 0 | 1 | 2 | 3 | 4 | 5 | 6 | 7 |
| Pixel distance 1-pel | 2-pel | 4-pel | 8-pel | 16-pel | 32-pel | 64-pel | 128-pel |

In some embodiments, MMVD uses an adaptive distance table based on an occurrence-based distance table reordering. For example, a distance index may be reordered according to the occurrence of usage of each distance index in previous coded pictures ranking from high to low. In some embodiments, MMVD candidate values are modified so that a CU coded in MMVD mode has a full-sample instead of a sub-sample motion vector if the MMVD distance is greater than a threshold.

According to some embodiments, an affine MMVD method, also called affine merge mode with prediction offsets, selects a first available affine merge candidate as a base predictor. This method then applies a motion vector offset to each control point's motion vector value from the base predictor. If there is no affine merge candidate available, the affine MMVD method is not used.

In some embodiments, in a per control point (CP) signaling method, a selected base predictor's inter prediction direction, and the reference index of each direction is used without change. For each control point, a zero MVD flag may be used to indicate whether the control point needs offset signaling. If a zero MVD flag is true, there's no other signaling needed for the control point. Otherwise, a distance index and an offset direction index may be signaled for the control point. Table 8 illustrates example signaled distance indexes and corresponding distance offsets.

TABLE 8

Distance Index and Corresponding Offset

| Distance IDX | 0 | 1 | 2 | 3 | 4 |
|---|---|---|---|---|---|
| Distance-offset | ½-pel | 1-pel | 2-pel | 4-pel | 8-pel |

In some embodiments, a direction index can represent four directions, as shown in Table 9, where only x or y direction may have an MV difference, but not in both directions.

TABLE 9

Direction IDX

| Offset Direction IDX | 00 | 01 | 10 | 11 |
|---|---|---|---|---|
| x-dir-factor | +1 | −1 | 0 | 0 |
| y-dir-factor | 0 | 0 | +1 | −1 |

In some embodiments, if the inter prediction is uni-prediction, the signaled distance offset is applied on the offset direction for each control point predictor. The resulting motion vector will be the MV value of each control point. In some embodiments, if the inter prediction is Bi-prediction, the signaled distance offset is applied on the signaled offset direction for control point predictor's L0 motion vector, and the offset to be applied on the L1 MV is applied on a mirrored basis.

According to some embodiments, the distance offset index and the offset direction index are signaled per block. The same offset may be applied to all available control points. The number of control points may be determined by the base predictor's affine type. The distance offset table and the offset direction tables may be the same as in Tables 8 and 9. When the signaling is performed for all the control points of the block at once, the zero MVD flag is not used.

When the occurrence statistics of the used offset values of the distance table is collected the same way on both encoder and decoder side, both encoder and decoder derive the new order of distance tables based on the occurrence statistics, and an updated distance table is used by the next picture for MMVD. These features introduce dependency between pictures, and cause error resilience issues. Embodiments of the present disclosure are directed to reducing this dependency, and the resulting error resilience issues. In this regard, embodiments of the present disclosure enhance the current design of the occurrence based MMVD distance table reordering by signaling an indication of which reordered distance table for decoder to use instead of having the decoder derive the table.

According to some embodiments, on the encoder side, after the MMVD distance table is reordered, the order code may be generated and signaled in a bitstream. In some embodiments, on decoder side, after decoding the order code, the MMVD distance table may be constructed based on the order code. In one embodiment, the order code of the MMVD distance table may be signaled in a slice header, tile/title group header, or in one of other headers.

In some embodiments, the order of the MMVD distance table is represented by an integer, which can be referred to as an order code. For the current MMVD table with 8 entries, the number may have 24 bits, which consists of 8 3-bit elements. Each 3-bit element may represent the original distance index value. Concatenating all the 8 elements in the order of the derived MMVD distance table would result in a particular integer value. The elements may be concatenated in descending order or ascending order. The number of elements may increase or decrease, thus the number of bits to represent each element may change accordingly.

In one example, for the original MMVD distance table as in Table 6, after reordering, the new order becomes {1-pel, 2-pel, 1/2-pel, 1/4-pel, 16-pel, 4-pel, 32-pel, 8-pel}, the order of the original distance index becomes {2, 3, 1, 0, 6, 4, 7, 5}. As shown in Table 10, the order code in Hex format is 0x4C8CB. In this regard, element index 0 corresponds to distance index 2, which has a pixel distance of 1-pel, and a binary value 010. Accordingly, the first three digits of the binary order code is 010. Each element and distance index have respective binary values, which when concatenated, form the binary order code and equivalent hex order code.

TABLE 10

Representation of the Order of the MMVD Distance Table

| | Element IDX | | | | | | | |
|---|---|---|---|---|---|---|---|---|
| | 0 | 1 | 2 | 3 | 4 | 5 | 6 | 7 |
| Distance IDX | 2 | 3 | 1 | 0 | 6 | 4 | 7 | 5 |
| Pixel Distance | 1-pel | 2-pel | ½-pel | ¼-pel | 16-pel | 4-pel | 32-pel | 8-pel |
| Binary Value | 010 | 011 | 001 | 000 | 110 | 010 | 111 | 101 |
| Binary Order Code | 010011001000110010111101 | | | | | | | |
| Hex Order Code | 0x4C8CBD | | | | | | | |

In some embodiments, the table code may be an integer value, and this order code consists of only 7 of the 8 elements, and the remaining element may be inferred. The inferred element may be the first element, or the last element, or any element with a predefined element index. The number of bits for the order code, when the last element is inferred, may be 21 instead of 24. The elements may be concatenated in descending order or ascending order. The elements may be concatenated in descending order or ascending order. The number of elements may increase or decrease, thus, the number of bits to represent each element may change accordingly.

In one example, for the original MMVD distance table as in Table 6, after reordering, the new order becomes {1-pel, 2-pel, 1/2-pel, 1/4-pel, 16-pel, 4-pel, 32-pel, 8-pel}, the order of the original distance index becomes {2, 3, 1, 0, 6, 4, 7, 5}. When the last element is inferred, only the first 7 elements may be coded in the order code, as shown in Table 11. The final order code is 0x99197.

TABLE 11

Representation of the Order of the MMVD Distance Table with the Last Element Inferred

| | Element IDX | | | | | | |
|---|---|---|---|---|---|---|---|
| | 0 | 1 | 2 | 3 | 4 | 5 | 6 |
| Distance IDX | 2 | 3 | 1 | 0 | 6 | 4 | 7 |
| Pixel Distance | 1-pel | 2-pel | 1/2-pel | 1/4-pel | 16-pel | 4-pel | 32-pel |
| Binary Value | 010 | 011 | 001 | 000 | 110 | 010 | 111 |
| Binary Order Code | | | 010011001000110010111 | | | | |
| Hex Order Code | | | 0x99197 | | | | |

According to some embodiments, the order code of the MMVD distance table may be signaled with prediction. A base order code may be signaled in a picture parameter set (PPS), sequence parameter set (SPS), or another header, and the difference between the order code and the base order code may be signaled in a slice header, tile/tile group header, or in one of the other headers. In one embodiment, the base order code may be a predefined value including all the elements of the MMVD distance table. For example, for an 8-element MMVD distance table, the base order may be predefined as {1/4-pel, 1/2-pel, 1-pel, 2-pel, 4-pel, 8-pel, 16-pel, 32-pel}, which has the distance index order of {0, 1, 2, 3, 4, 5, 6, 7}. The binary values for each element are as shown in Table 12, and the base order code in Hex value is 0x53977.

TABLE 12

Representation of the Order of the MMVD Distance Table for the Base Order Code

| | Element IDX | | | | | | | |
|---|---|---|---|---|---|---|---|---|
| | 0 | 1 | 2 | 3 | 4 | 5 | 6 | 7 |
| Distance IDX | 0 | 1 | 2 | 3 | 4 | 5 | 6 | 7 |
| Pixel Distance | 1/4-pel | 1/2-pel | 1-pel | 2-pel | 4-pel | 8-pel | 16-pel | 32-pel |
| Binary Value | 000 | 001 | 010 | 011 | 100 | 101 | 110 | 111 |
| Binary Order Code | | | 000001010011100101110111 | | | | | |
| Hex Order Code | | | 0x53977 | | | | | |

In some embodiments, for coding an order code for a picture on the encoder side, the difference between a derived actual order code value and the base order code value is signaled in the bitstream. The value of the difference may be referred to as an order code delta. In some embodiments, on the decoder side, after decoding the order code delta, the value is added with the predefined base order code to derive the actual order code as illustrated in Eq. 1. Subsequently, the MMVD distance table can be derived according to the order code.

$$\text{Order code} = \text{Order code delta} + \text{base order code} \quad \text{Eq. 1:}$$

The predefined value of the base order code may not be limited to the above example. For example, the predefined value may be in any predefined order.

According to some embodiments, a number of predefined distance table orders (referred to as a group of tables) are stored on both the encoder and the decoder. For the encoder side, the index of the table selected from the group for the current picture, slice, tile or any segment of the picture, may be signaled in the bitstream. At the decoder side, the table in the group corresponding to the index received may be used as the MMVD distance table for the current picture, slice, tile or any segment of the picture, the same way used by the encoder side.

In some examples, the distance entries in all tables of the group are different permutations of the same candidate distances (e.g., see examples in Table 11). In other examples, the distance entries in all tables of the group may be different. For example, there may be two different tables in the group such as one from Table 6 and another from Table 7. An index being 0 or 1 may be used to select which one is used.

In some examples, a set of predefined tables may be used. The encoder may first signal a flag to indicate whether a predefined table is used. If the predefined table is used, the table index is signaled. If the predefined table is not used, a new non-predefined table is signaled at the decoder. The non-predefined table may be buffered and be referenced later by other pictures. To identify buffered non-predefined tables, another table index may be signaled. The maximum number of non-predefined tables may be constrained by a number which is predefined or signaled in the bitstream. When the buffered non-predefined tables reach the maximum number, a table may be removed from the buffer. For example, the oldest table may be removed. The buffer may be reset by a certain flag signaled in the bitstream, or other buffer reset mechanism, such as by an instantaneous decoding refresh (IDR) picture.

In some examples, a set of predefined tables may be signaled in decoder parameter set (DPS), video parameter set (VPS) or sequence parameter set (SPS). The set signaled in DPS may be activated and used in the entire bitstream including all coded video sequences (CVS) coded sequentially. The set signaled in VPS may be activated and used within group of CVSs, where each CVS is coded for each layer or component. The set signaled in SPS may be activated and used within the associated CVS. A flag signaled in the picture parameter set (PPS), header parameter set (HPS), adaptive parameter set (APS), slice header or tile/tile group header may indicate whether an index may indicate one of the predefined tables or a re-indexed (re-ordered) set is used in the associated pictures or tiles/tile groups. If the flag indicates that the index is present, the index may specify which predefined table is used for coding CUs in the associated pictures among the predefined tables. If multiple tables are defined in different parameters, the tables defined in the parameter set, which is lastly activated, are activated and used. If the flag indicates that the index is not present and the distance order is manually defined, the distance indices are signaled as given in Tables 7, 8, and 9.

In some examples, a flag signaled in a PPS, HPS, APS, slice header or tile/tile group header may indicate whether to use the predefined tables, or to explicitly signal all pixel distances corresponding to elements indices. If the flag indicates that all or partial pixel distance information is explicitly signaled, then the predefined tables in any parameter set are not activated and used within the associated pictures, and the table defined in the current PPS, HPS, APS, slice header or tile/tile group header is used for coding CUs in the associated pictures. The newly defined table may include all mapping information from element index to pixel distance.

In some examples, a flag signaled in a PPS, HPS, APS, slice header or tile/tile group header may indicate whether to use the predefined tables or to explicitly signal pixel distance difference corresponding to elements indices. If the flag indicates that all or partial pixel distance difference is explicitly signaled, then one of the predefined tables in any parameter set is activated and used within the associated pictures. Furthermore, the pixel distance value may be obtained by adding the pixel distance difference values explicitly signaled for the current pictures to the predefined pixel distance values.

According to some embodiments, when any of the affine MMVD methods is used, the methods disclosed above for signaling the MMVD distance table order code or signaling the MMVD distance table order from a set of predefined candidates may be applied to signal a reordered distance offset table for the affine MMVD. In some examples, any affine MMVD method may have a different distance offset table from the default table used for MMVD. Furthermore, the number of elements in the distance offset table may be different from the one used for MMVD so that the number of bits required for representing each element of the distance offset table for affine MMVD may be different from that of MMVD.

Figure 17:
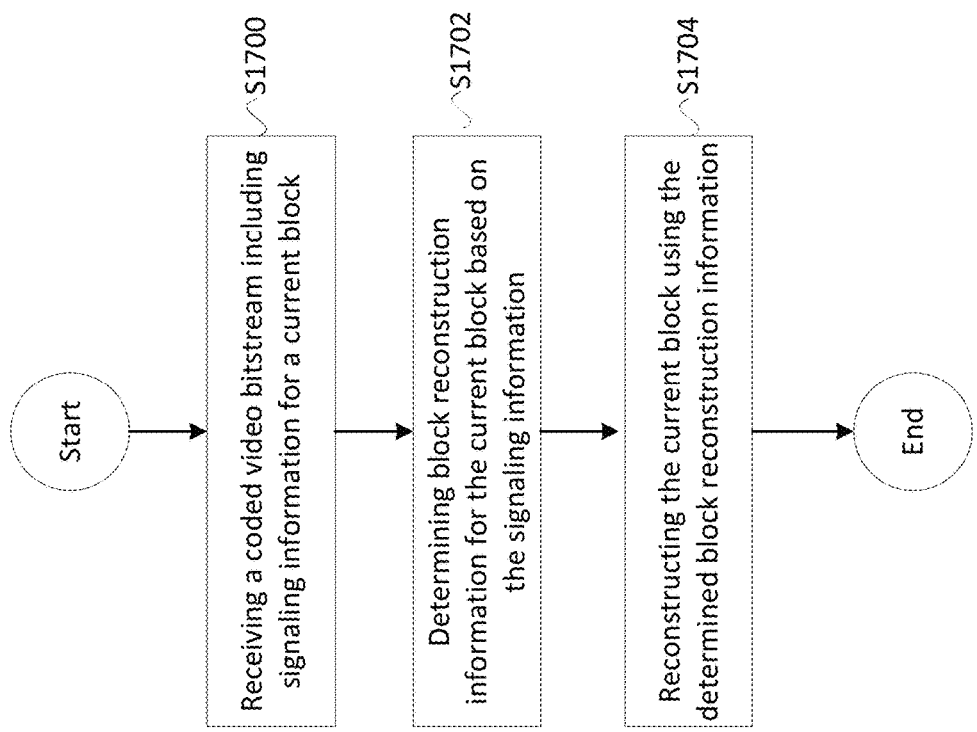
FIG. 17 is an illustration of an example decoding process in accordance with an embodiment.

FIG. 17 illustrates an embodiment of a process performed by a decoder. The process may start at step (S1700) where a coded video bitstream including signaling information for a current block is received. The process proceeds to step (S1702) where the block reconstruction information for the current block is determined based on the signaling information. The process proceeds to step (S1704) where the current block is reconstructed using the determined block reconstruction information. As an example, the signaling information may indicate whether a current block is coded in a merge mode, and whether multi hypothesis prediction is enabled for the current block. If multi hypothesis prediction is enabled, the block reconstruction information may include a first merge candidate specified by a merge index, and a second merge candidate derived from the merge index. As another example, the current block is coded in the MMVD mode, and the signaling information includes an order code for an MMVD distance table. If the current block is coded in the MMVD mode, the block reconstruction information may be a motion vector obtained using the MMVD distance table.

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
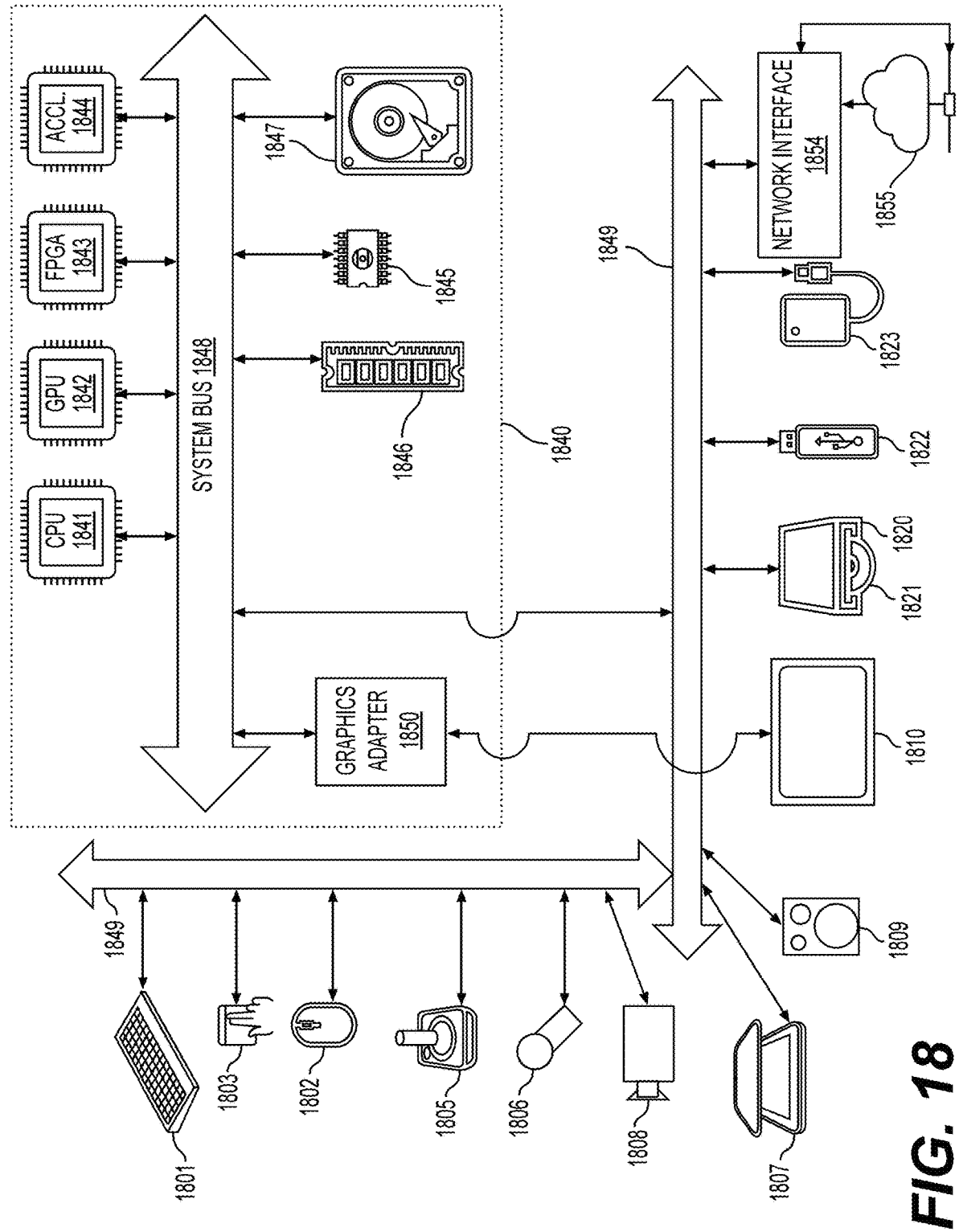
FIG. 18 is a schematic illustration of a computer system in accordance with an embodiment of the present disclosure.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method of video decoding performed in a video decoder, the method comprising receiving a coded video bitstream including signaling information for a current block; determining block reconstruction information for the current block based on the signaling information; and reconstructing the current block using the determined block reconstruction information.

(2) The method according to feature (1), in which the signaling information indicates that the current block is coded in merge mode, and the signaling information further indicates whether the current block is coded in multi-hypothesis mode.

(3) The method according to feature (2), in which in response to a determination that the signaling information indicates that the current block is coded in the multi hypothesis mode, the signaling information further includes a merge index having a maximum value of a maximum number of candidates in a merge candidate list minus two.

(4) The method according to feature (3), in which the merge index is coded in a unary code.

(5) The method according to feature (3) or (4), in which the merge mode is signaled with a first flag, and the multi hypothesis mode is signaled with a second flag.

(6) The method according to any one of features (3)-(5), in which the block reconstruction information includes a first merge candidate specified by the merge index, and a second merge candidate derived from the merge index.

(7) The method according to any one of features (2)-(6), in which the current block is determined not to be coded in the multi hypothesis mode in response to a determination that a number of candidates in a merge candidate list is less than two.

(8) The method according to features (2)-(7), in which the current block is determined not to be coded in the multi hypothesis mode in response to a determination that a merge index has a value greater than or equal to a maximum number of candidates in a merge candidate list minus 1.

(9) The method according to feature (1), in which the current block is coded with a merge motion vector difference (MMVD) mode, and the signaling information includes an order code for an MMVD distance table.

(10) The method of feature (9), in which the block reconstruction information includes a motion vector obtained using the MMVD distance table.

(11) The method according to feature (9) or (10), in which the order code is a binary order code that specifies one or more elements of the MMVD distance table.

(12) The method according to feature (11), in which at least one element of the MMVD distance table is inferred from the binary order code.

(13) The method according to any one of features (9)-(12), in which the order code is a base order code, and a final order code that specifies one or more elements of the MMVD distance table is determined from a sum of the base order code and a difference between the final order code and the base order code.

(14) The method according to any one of features (12) or (13), in which the difference between the final order code and the base order code is included in the signaling information.

(15) The method according to any one of features (9)-(14), in which the order code is included in one of a header of a picture parameter set (PPS) and a header of a sequence parameter set (SPS).

(16) A video decoder for video decoding, comprising processing circuitry configured to: receive a coded video bitstream including signaling information for a current block, determine block reconstruction information for the current block based on the signaling information, and reconstruct the current block using the determined block reconstruction information.

(17) The video decoder according to feature (16), in which the signaling information indicates that the current block is coded in merge mode, and the signaling information further indicates whether the current block is coded in multi-hypothesis mode.

(18) The video decoder according to feature (17), in which in response to a determination that the signaling information indicates that the current block is coded in the multi hypothesis mode, the signaling information further includes a merge index having a maximum value of a maximum number of candidates in a merge candidate list minus two.

(19) The video decoder according to feature (18), in which the merge index is coded in a unary code.

(20) A non-transitory computer readable medium having instructions stored therein, which when executed by a processor in a video decoder causes the processor to execute a method comprising receiving a coded video bitstream including signaling information for a current block; determining block reconstruction information for the current block based on the signaling information; and reconstructing the current block using the determined block reconstruction information.

What is claimed is:

1. A method of video decoding performed in a video decoder, the method comprising:
   receiving a coded video bitstream including signaling information for a current block, the signaling information indicating (i) that the current block is coded in a merge mode, and (ii) whether the current block is coded in a multi-hypothesis mode;
   determining block reconstruction information for the current block based on the signaling information; and
   reconstructing the current block using the determined block reconstruction information wherein in response to a determination that the signaling information indicates that the current block is coded in the multi-hypothesis mode, the signaling information further includes a merge index having a maximum value of a maximum number of candidates in a merge candidate list minus two.

2. The method according to claim 1, wherein the merge index is coded in a unary code.

3. The method according to claim 1, wherein the merge mode is signaled with a first flag, and the multi-hypothesis mode is signaled with a second flag.

4. The method according to claim 1, wherein the block reconstruction information includes a first merge candidate specified by the merge index, and a second merge candidate derived from the merge index.

5. The method according to claim 1, wherein the current block is determined not to be coded in the multi-hypothesis mode in response to a determination that a number of candidates in the merge candidate list is less than two.

6. The method according to claim 1, wherein the current block is determined not to be coded in the multi-hypothesis mode in response to a determination that a merge index has a value greater than or equal to the maximum number of candidates in the merge candidate list minus 1.

7. The method according to claim 1, wherein the current block is coded with a merge motion vector difference (MMVD) mode, and the signaling information includes an order code for an MMVD distance table.

8. The method of claim 7, wherein the block reconstruction information includes a motion vector obtained using the MMVD distance table.

9. The method according to claim 7, wherein the order code is a binary order code that specifies one or more elements of the MMVD distance table.

10. The method according to claim 9, wherein at least one element of the MMVD distance table is inferred from the binary order code.

11. The method according to claim 7, wherein the order code is a base order code, and a final order code that specifies one or more elements of the MMVD distance table is determined from a sum of the base order code and a difference between the final order code and the base order code.

12. The method according to claim 11, wherein the difference between the final order code and the base order code is included in the signaling information.

13. The method according to claim 7, wherein the order code is included in one of a header of a picture parameter set (PPS) and a header of a sequence parameter set (SPS).

14. A video decoder for video decoding, comprising:
processing circuitry configured to:
receive a coded video bitstream including signaling information for a current block, the signaling information indicating (i) that the current block is coded in a merge mode, and (ii) whether the current block is coded in a multi-hypothesis mode,
determine block reconstruction information for the current block based on the signaling information, and
reconstruct the current block using the determined block reconstruction information,
wherein in response to a determination that the signaling information indicates that the current block is coded in the multi-hypothesis mode, the signaling information further includes a merge index having a maximum value of a maximum number of candidates in a merge candidate list minus two.

15. The video decoder according to claim 14, wherein the merge index is coded in a unary code.

16. A non-transitory computer readable medium having instructions stored therein, which when executed by a processor in a video decoder causes the processor to execute a method comprising:
receiving a coded video bitstream including signaling information for a current block, the signaling information indicating (i) that the current block is coded in a merge mode, and (ii) whether the current block is coded in a multi-hypothesis mode;
determining block reconstruction information for the current block based on the signaling information; and
reconstructing the current block using the determined block reconstruction information
wherein in response to a determination that the signaling information indicates that the current block is coded in the multi-hypothesis mode, the signaling information further includes a merge index having a maximum value of a maximum number of candidates in a merge candidate list minus two.

* * * * *